(12) United States Patent
Levi et al.

(10) Patent No.: US 12,371,124 B2
(45) Date of Patent: *Jul. 29, 2025

(54) SYSTEMS AND METHODS FOR CONFIGURING PERSONAL MOBILITY VEHICLE BRAKES BASED ON LOCATION

(71) Applicant: Lyft, Inc., San Francisco, CA (US)

(72) Inventors: Dor Levi, San Francisco, CA (US); Carlos Ellis Whitt, San Francisco, CA (US); John Peter Walpole, New York, NY (US); Nicholaus Ian Lubinski, Fairfax, CA (US); Steven James Martisauskas, San Francisco, CA (US); Lucas Jon Van Houten, San Francisco, CA (US); Gregoire Ludovic Vincent Vandenbussche, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/497,458

(22) Filed: Oct. 30, 2023

(65) Prior Publication Data

US 2024/0174320 A1 May 30, 2024

Related U.S. Application Data

(63) Continuation of application No. 16/541,225, filed on Aug. 15, 2019, now Pat. No. 11,814,133.

(51) Int. Cl.
*B62L 5/18* (2006.01)
*B62K 3/00* (2006.01)
(Continued)

(52) U.S. Cl.
CPC .................. *B62L 5/18* (2013.01); *B62K 3/00* (2013.01); *B62L 3/06* (2013.01); *B62L 5/20* (2013.01);
(Continued)

(58) Field of Classification Search
CPC ...... B62L 3/00; B62L 3/06; B62L 5/18; B62L 5/20; B62K 3/00; B62K 25/04;
(Continued)

(56) References Cited

U.S. PATENT DOCUMENTS 5,515,026 A * 5/1996 Ewert ................... B60Q 1/525
340/384.1
10,029,683 B1 * 7/2018 Ginther ................. B60W 50/16
(Continued)

FOREIGN PATENT DOCUMENTS

WO WO-2018185578 A1 * 10/2018 ........... B60T 8/1706

*Primary Examiner* — Robert A. Siconolfi
*Assistant Examiner* — San M Aung
(74) *Attorney, Agent, or Firm* — Baker Botts L.L.P.

(57) ABSTRACT

The disclosed method may include configuring one or more brakes based on a braking-related attribute expected at a geographic location being traversed by a personal mobility vehicle. By configuring the application of brakes of a personal mobility vehicle based on terrain, environmental conditions, and other geographic features, the system may reduce the risk of the vehicle skidding or tipping due to over-braking. In some embodiments, a rider may use a single brake lever to indicate a desire to brake and the system may make determinations about how to apply a combination of mechanical and electrical brakes to front and back wheels based at least in part on the location of the personal mobility vehicle. By configuring brake engagement based on a combination of controls and map data, the system may improve user experience and user safety, especially for inexperienced riders.

20 Claims, 16 Drawing Sheets

(51) Int. Cl.
  *B62L 3/06* (2006.01)
  *B62L 5/20* (2006.01)
  *G06K 19/02* (2006.01)
  *G06K 19/04* (2006.01)
(52) U.S. Cl.
  CPC ......... *G06K 19/022* (2013.01); *G06K 19/041* (2013.01)
(58) Field of Classification Search
  CPC ...... B62G 6/01; B62G 6/00; B62J 3/08; B62J 3/00; B62J 1/08; B62M 6/45; B62M 6/55; B62M 9/122; B60Q 1/525; B60Q 5/005; B60Q 5/006; B60Q 9/00; B60T 7/12; B60W 30/0953; B60W 30/0956; B60W 30/08; B60W 30/09; B60W 30/095
  USPC ...................................................... 188/24.11
  See application file for complete search history.

(56) References Cited

U.S. PATENT DOCUMENTS

| | | | |
|---|---|---|---|
| 2006/0149517 A1* | 7/2006 | El-Sayed | G06F 30/23 703/7 |
| 2010/0131164 A1* | 5/2010 | Carter | B60L 50/52 701/61 |
| 2012/0022757 A1* | 1/2012 | Lee | B60T 7/18 701/70 |
| 2018/0222473 A1* | 8/2018 | Shami | B62J 6/24 |
| 2019/0152389 A1* | 5/2019 | Nakakura | B62J 3/00 |

* cited by examiner

SYSTEMS AND METHODS FOR CONFIGURING PERSONAL MOBILITY VEHICLE BRAKES BASED ON LOCATION

PRIORITY

This application is a continuation under 35 U.S.C. § 120 of U.S. patent application Ser. No. 16/541,225, filed 15 Aug. 2019, which is incorporated herein by reference.

BACKGROUND

Personal mobility vehicles, such as bicycles and scooters, are a popular means of transit. Traditionally, personal mobility vehicles have been individual owned and most commonly ridden by the owner. However, an increasing number of organizations offer short-term rentals of personal mobility vehicles, either as part of a longer trip facilitated by a transportation network or as a standalone method of transportation. In some cases, riders who are renting personal mobility vehicles may not have extensive experience riding vehicles of this type. This may be especially problematic if the vehicle in question is electrically assisted, such as an electric scooter or bicycle, which is capable of reaching higher speeds than a manually powered version of the same vehicle and therefore may be more dangerous or more difficult for an inexperienced operator. One of the most important operations for a rider of any vehicle to master is decreasing speed.

Traditional models of bicycles and scooters may have separate brakes on each wheel. In some examples, an inexperienced rider may not be familiar with which brake to engage more strongly in a given situation or type of terrain. Additionally, some bicycles or scooters may be equipped with anti-lock brakes that are most optimally engaged in different ways on different types of terrain. Accordingly, the instant disclosure identifies and addresses a need for additional and improved systems and methods for configuring personal mobility vehicle brakes based on location.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
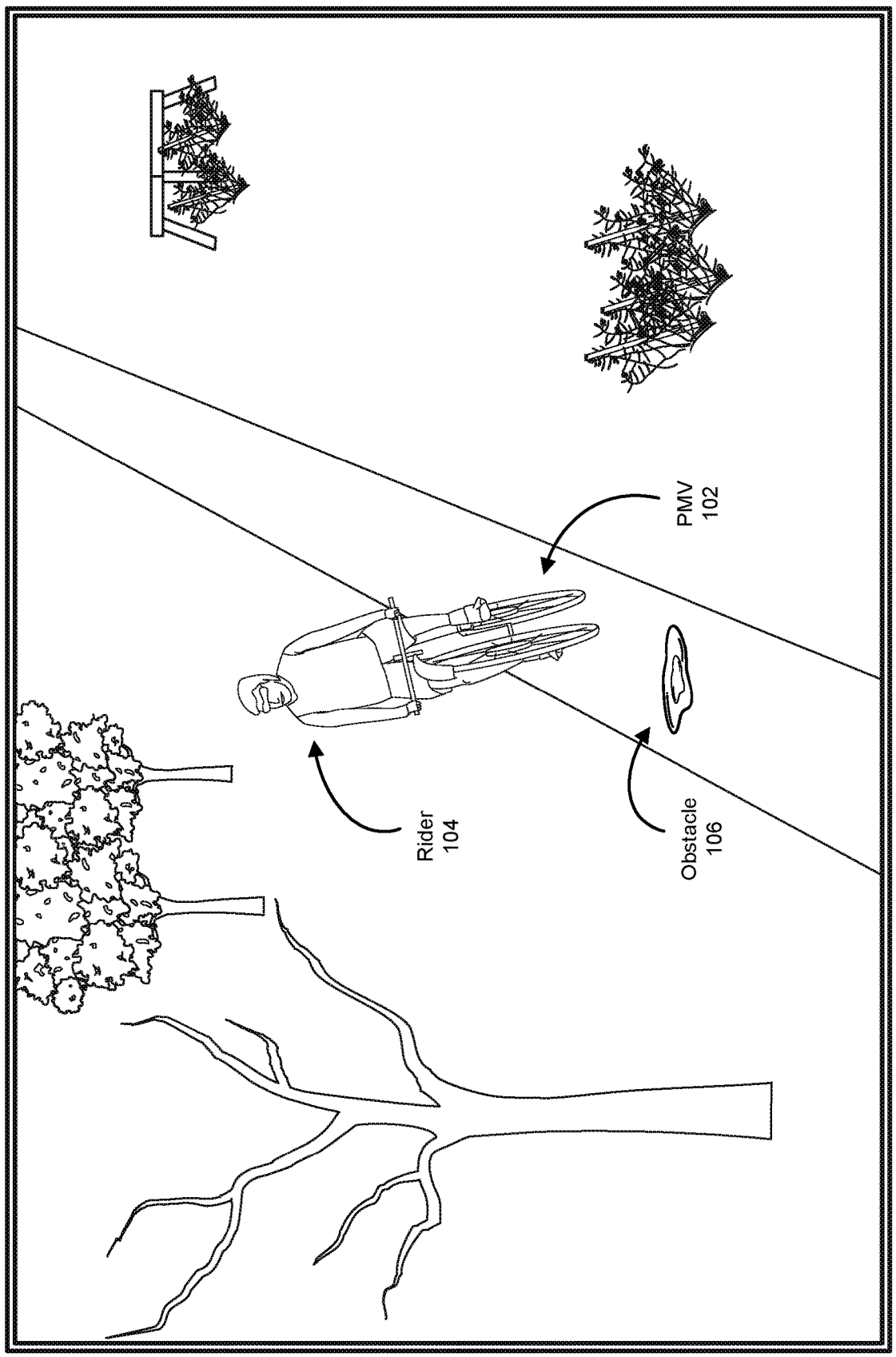
FIG. 1 is an illustration of an example personal mobility vehicle in environmental context relevant to braking.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to a system for multiple brakes on a personal mobility vehicle configured based at least in part on data about the location that the personal mobility vehicle is currently traversing. An intelligently configured braking system for a personal mobility vehicle may have a number of advantages. By determining a front and rear brake differential and/or applying anti-lock braking systems based on terrain and/or environmental conditions, the system may reduce the risk of the vehicle skidding or tipping due to over-braking. In some embodiments, a rider may use a single brake lever to indicate a desire to brake and the system may make determinations about how to apply a combination of mechanical and electrical brakes to front and back wheels based at least in part on the current context. In some embodiments, two brake levers may be available to a rider and the system may use various forms of feedback to indicate to the rider which lever to depress based on the terrain and/or environmental conditions of the location. By applying different braking systems based on a combination of controls and location-based data, the system may improve user experience and user safety, especially for inexperienced riders. Accordingly, as may be appreciated, the systems and methods described herein may provide advantages to personal mobility vehicles and/or the field of transportation by facilitating the safe use of personal mobility vehicles by inexperienced riders.

As will be explained in greater detail below, a dynamic transportation matching system may arrange transportation on an on-demand and/or ad-hoc basis by, e.g., matching one or more transportation requestors and/or transportation requestor devices with one or more transportation providers and/or transportation provider devices. For example, a dynamic transportation matching system may match a transportation requestor to a transportation provider that operates within a dynamic transportation network (e.g., that is managed by, coordinated by, and/or drawn from by the dynamic transportation matching system to provide transportation to transportation requestors).

In some examples, available sources of transportation within a dynamic transportation network may include vehicles that are owned by an owner and/or operator of the dynamic transportation matching system. Additionally or alternatively, sources of transportation within a dynamic transportation network may include vehicles that are owned outside of the dynamic transportation network but that participate within the dynamic transportation network by agreement. In some examples, the dynamic transportation network may include lane-bound vehicles (e.g., cars, light trucks, etc.) that are primarily intended for operation on roads. Furthermore, the dynamic transportation network may include personal mobility vehicles that are not bound to traditional road lanes, such as scooters, bicycles, electric scooters, electric bicycles, and/or any other suitable type of personal mobility vehicle. In some embodiments, a dynamic transportation network may include autonomous vehicles (e.g., self-driving cars) that may be capable of operating with little or no input from a human operator.

FIG. 1 illustrates an example rider of a personal mobility vehicle (PMV) in environmental context relevant to braking. In one example, a rider 104 of a PMV 102 may an encounter an obstacle 106, such as a puddle, that prompts rider 104 to attempt to decelerate PMV 102. In some embodiments, PMV 102 may be equipped with multiple brakes, such as a front wheel brake and a rear wheel brake. In some examples, various different conditions of the location may affect the optimal way to apply brakes, such as the slope of the path down which PMV 102 is moving, surface condition of the path (e.g., wet, dry, well-maintained, poorly-maintained, etc.), and/or the surface type of the path (e.g., gravel, pavement, uneven pavement, etc.). If rider 104 is not experienced at operating PMV 102, rider 104 may not engage the brakes in an optimal way. For example, rider 104 may over-apply the front wheel brake, causing PMV 102 to be at risk of tipping. In another example, rider 104 may over-apply both sets of brakes, causing PMV 102 to be at risk of losing traction and/or skidding. By intelligently engaging multiple brakes and/or anti-lock braking systems based on information known about the location and/or indicating to rider 104 how to engage the brakes, the systems described herein may improve the user experience and safety of rider 104.

Figure 2:
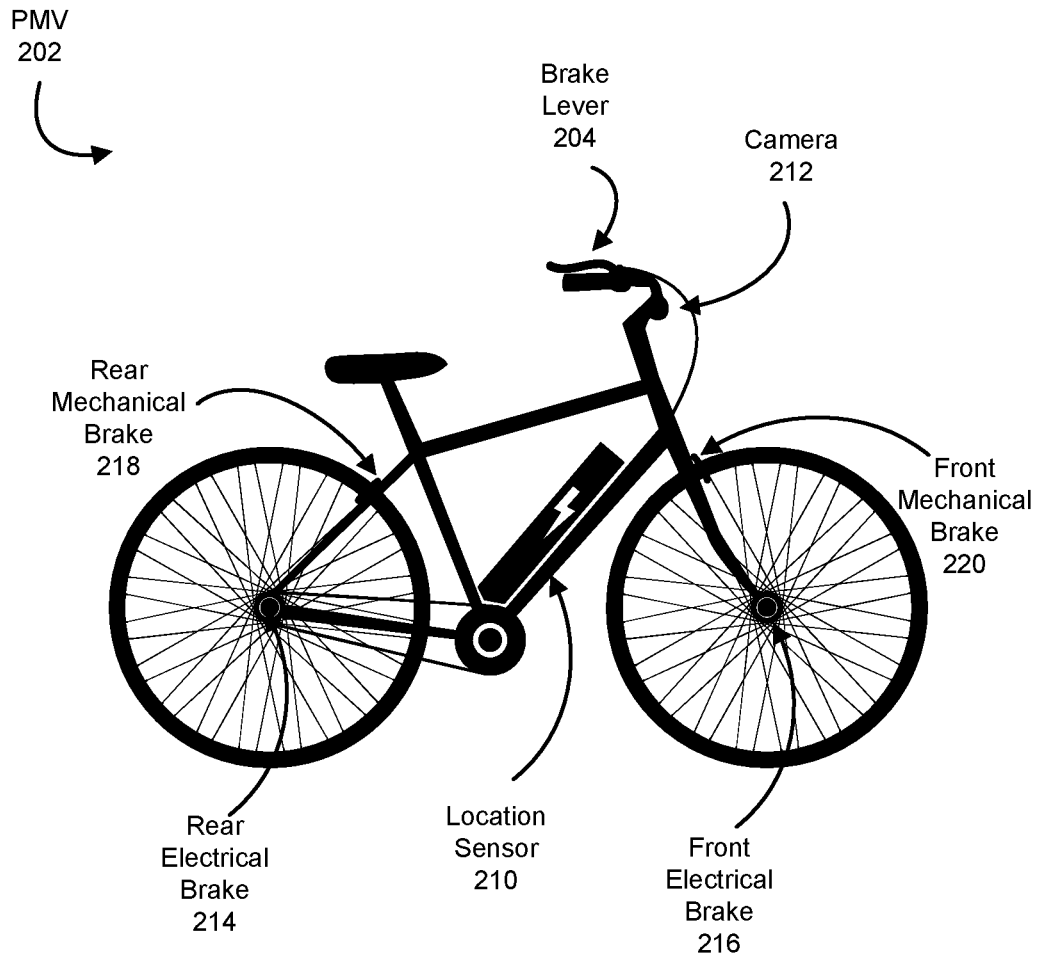
FIG. 2 is an illustration of an example personal mobility vehicle.

FIG. 2 illustrates an example PMV with multiple brakes. As illustrated in FIG. 2, a PMV 202 may have a brake lever 204 that a rider of PMV 202 can use to indicate a desire to decelerate PMV 202. The term "brake lever," as used herein, may refer to any type of physical mechanism that is capable of receiving input from a rider. In some embodiments, a brake lever receiver may be a physical lever that can be depressed to indicate a desire to brake. In one embodiment, a brake lever may capable of being depressed by varying amounts, indicating an intended level of engagement of one or more braking systems. In one embodiment, a brake lever may be directly connected to one or more brake systems (e.g., mechanical brakes). Alternatively, a brake lever may not be directly connected to the brakes but instead may be used by the systems described herein to detect whether the rider desires to decelerate. In some embodiments, the systems described herein may measure pressure on a brake lever and/or hydraulic fluid in a brake system to determine how forcefully a rider wishes to decelerate. In some embodiments, brake lever 204 may represent other types of input receivers, such as a button, a rotatable dial and/or grip, a switch, and/or a pressure sensor.

In some embodiments, PMV 202 may be equipped with a rear electrical brake 214, front electrical brake 216, rear mechanical brake 218, and/or front mechanical brake 220. In some examples, front mechanical brake 218 and/or rear mechanical brake 220 may decelerate PMV 202 by applying pressure to a front or rear wheel of PMV 202, respectively, decreasing the speed of rotation of the wheel via an increase in friction. In some embodiments, front electrical brake 216 and/or rear electrical brake 214 may decelerate PMV 202 by applying pressure to a wheel and/or reducing power to a wheel. The term "brake," as used herein, may generally refer to any mechanism for reducing the velocity of (i.e., slowing down) a PMV. In some embodiments, PMV 202 may be equipped with a location sensor 210. Location sensor 210 may generally represent any type of system and/or sensor capable of reporting a geographic location, such as a global positioning system (GPS), a simultaneous localization and mapping system, and/or any other suitable type of location system. Additionally or alternatively, PMV 202 may be equipped with additional sensors that report on environmental conditions at the location of PMV 202, such as a camera 212, a thermometer, a barometer, and/or a hygrometer.

Figure 3:
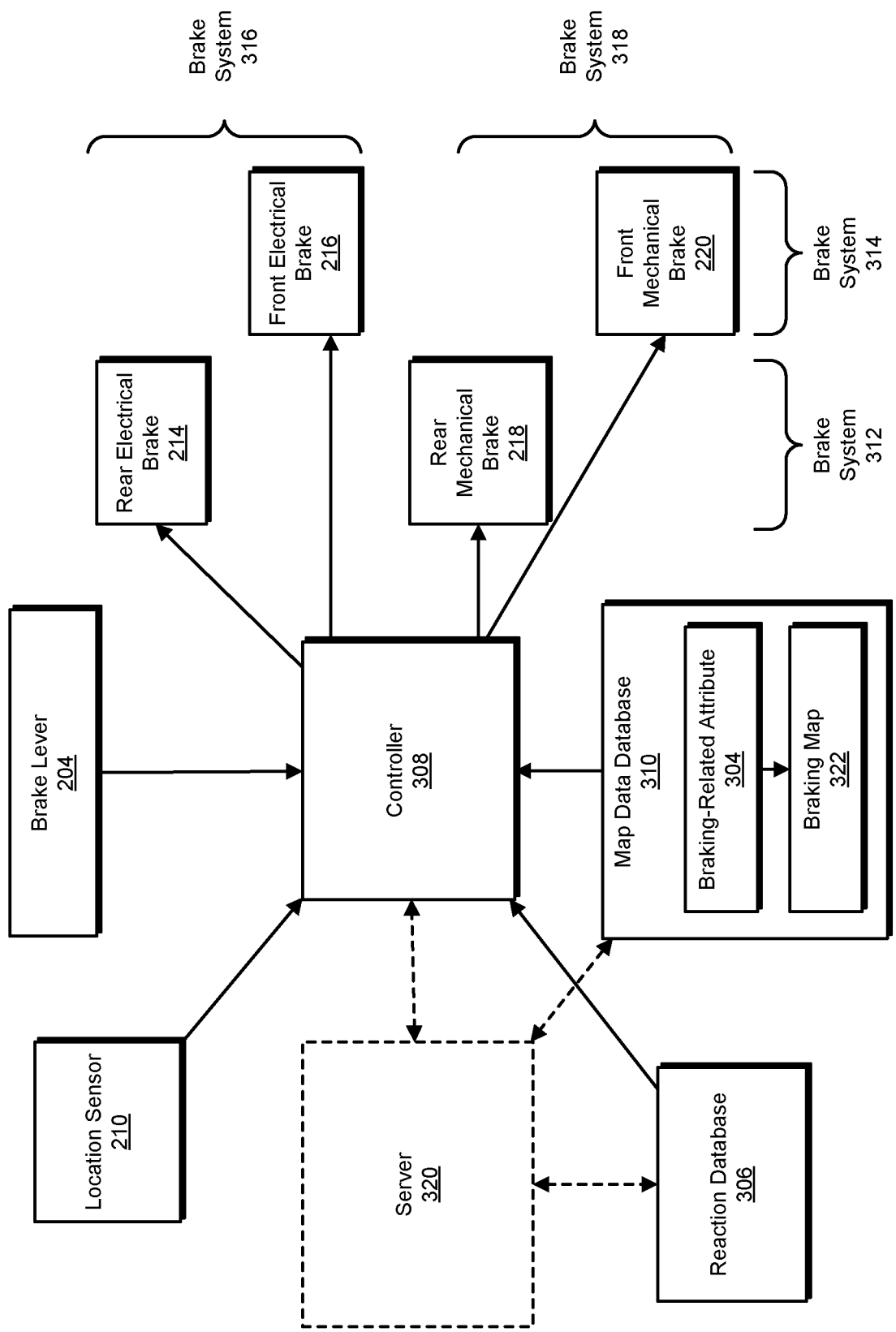
FIG. 3 is a block diagram of an example system for configuring personal mobility vehicle brakes based on location.

FIG. 3 illustrates an example system for engaging multiple brakes on a PMV based at least in part on location. In some embodiments, a controller 308 may receive input from location sensor 210 and/or additional sensors. In some embodiments, controller 308 may receive data from a reaction database 306. For example, reaction database 306 may include information about how the current rider of the PMV has reacted to similar braking conditions in the past (e.g., the rider has over-applied the front brake in previous situations where the PMV is on a downhill slope, creating a risk of tipping and/or the rider has historically applied brakes too cautiously in areas with low traction, increasing the risk of collision) and/or how riders of other PMVs associated with the dynamic transportation network have reacted to similar braking conditions. In one embodiment, controller 308 may query a map data database 310 for information relevant to braking at the current location. In some examples, map data database 310 may return one or more braking-related attributes, such as braking related attribute 304, that potentially affect braking at the location being traversed by the PMV. In some embodiments, map data database 310 may store data collected by various PMVs that are associated with a dynamic transportation network. Additionally or alternatively, map data database 310 may store data collected by users (e.g., PMV riders and/or additional users). For example, a user may send information to map data database 310 indicating that a particular area is currently wet, has a steep slope, and/or has recently had a pothole repaired and now is a safer riding surface. In some embodiments, map data database 310 may store one or more braking maps that relate braking-related attributes to geographic locations, such as braking map 322. Examples of braking-related attributes based on location may include, without limitation, ground slope, ground surface type, surface condition, expected weather (e.g., damp versus dry), and/or nearby obstacle density (e.g., other traffic, imperfections in the road surface, nearby objects such as trees, etc.).

In some embodiments, controller 308 may use any or all of this information to intelligently engage rear electrical brake 214, front electrical brake 216, rear mechanical brake 218, and/or front mechanical brake 220 in response to receiving input from brake input receiver 204. In one embodiment, controller 308 engage the various brakes by determining a configuration of the braking system. The term "configuration," as used herein, may generally refer to any combination of level of application of force, speed of application of force, engagement-disengagement cycle, and/or any other attributes that may describe the engagement of one or more brakes over a period of time. In some examples, controller 308 may configure the brakes in a skid-reducing configuration, such as by engaging and disengaging the brakes (e.g., using an anti-lock braking system). In some embodiments, controller 308 may determine, as part of a PMV, based on the aforementioned information, a configuration of the braking system. Additionally or alternatively, a server 320 may determine, based on any or all of the aforementioned information, a configuration of the braking system and/or may send braking instructions to controller 308 that specify a configuration of the braking system and/or how to engage the brakes. In some examples, server 320 may send separate front brake instructions and rear brake instructions. For example, server 320 may determine based on a braking map that the PMV is going downhill and may send braking instructions to controller 308 to engage rear mechanical brake 218. In another example, server 320 may determine, based on a braking map, that the PMV is in a location a surface type and/or surface condition with a low level of traction traction and may, based on the surface condition, send braking instructions intended to minimize the risk of skidding. In some embodiments, the braking instructions may be computing instructions executable by a processor of controller 308. In some examples, server 320 may cause the PMV to engage the braking system by sending the braking instructions to controller 308. Additionally or alternatively, server 320 may enable the PMV to engage one or more braking systems by sending the braking instructions to controller 308.

In some embodiments, rear electrical brake 214 and electrical brake 216 may form brake system 316 (i.e., the electrical brake system) and/or rear mechanical brake 218 and front mechanical brake 220 may form brake system 318 (i.e., the mechanical brake system). Additionally or alternatively, rear electrical brake 214 and rear mechanical brake 218 may form brake system 312 (i.e., the rear brake system) and/or front electrical brake 216 and front mechanical brake 220 may form brake system 314 (i.e., the front brake system). The term "brake system," as used herein, generally refers to any set of one or more brakes on a PMV. In some embodiments, controller 308 may engage different brake systems and/or different individual brakes with different levels of force and/or speed based on the information received from the sensors, reaction database 306, and/or map data database 310. In some embodiments, controller 308 may engage individual brakes and/or brake systems by determining a distribution differential for engaging the brakes and/or brake systems. The term "distribution differential," as used herein, refers to any situation where different brakes are engaged with various amounts of speed and/or force (including no force). For example, one distribution differential may engage brake system 312 and brake system 314 with equal force and speed, while a different distribution differential may engage brake system 312 with greater force and/or speed than brake system 314. In some embodiments, controller 308 may determine the distribution differential based at least in part on a condition affecting the PMV that is detected by one or more of the sensors and/or retrieved from map data database 310.

Figure 4:
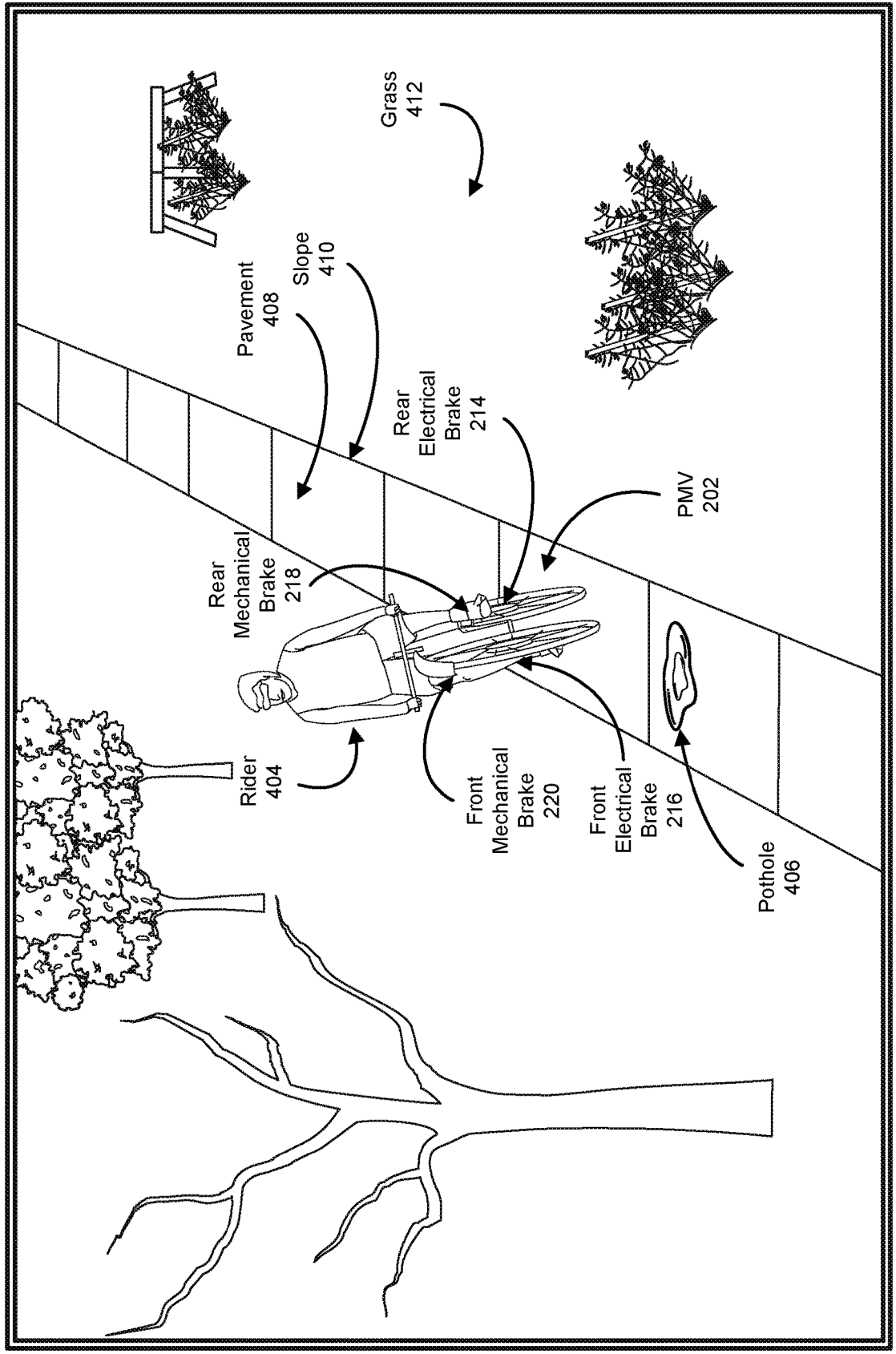
FIG. 4 is an illustration of an example personal mobility vehicle in environmental context relevant to braking.

FIG. 4 illustrates an example rider of a PMV in a context relevant to braking. In one example, a rider 404 of PMV 202 may encounter a pothole 406 that prompts rider 404 to attempt to decelerate PMV 202. In some examples, the systems described herein may engage various brakes and/or brake systems of PMV 202 based at least in part on conditions affecting PMV 202. For example, the systems described herein may retrieve map data that indicates that slope 410 is present in the location being traversed by PMV 202. In this example, the systems described herein may engage regenerative braking systems in front electrical brake 216 and/or rear electrical brake 214 in response to identifying the downhill slope. In some embodiments, the systems described herein may reduce the engagement of the mechanical brake system when using regenerative braking and/or otherwise calculate a distribution differential between the mechanical and electrical braking systems based at least in part on the relevance of regenerative braking to the current situation. In some embodiments, in response to detecting that PMV 202 is moving downhill, the systems described herein may engage rear mechanical brake 218 more strongly than front mechanical brake 220 in order to reduce the risk of tipping. In one embodiment, the systems described herein may reduce the throttle of PMV 202 to decelerate PMV 202 and/or reduce potentially unwanted acceleration of PMV 202 in response to detecting that PMV 202 is moving downhill.

Additionally or alternatively, the systems described herein may engage brakes more strongly than otherwise and/or minimize the use of anti-lock braking systems in response to surface conditions of the area that PMV 202 is traversing. For example, the systems described herein may minimize the use of anti-lock brakes in response to determining, based on stored map data, that PMV 202 is currently traversing pavement 408 that has a high level of traction (and thus a low probability of inducing sliding and/or skidding), a favorable surface condition for braking. In some embodiments, the systems described herein may use data gathered from previous riders traversing the location. For example, the location may include different surface types and/or surface conditions, pavement 408 and grass 412, and the systems described herein may determine, based on past rider behavior (e.g., as detected by sensors that monitor environmental conditions and/or vehicle motion), that most riders traversing the location ride on pavement 408 and therefore rider 404 is significantly more likely to be riding on pavement 408 than on grass 412. In some embodiments, the systems described herein may use previous behavior of rider 404 and/or riders with similar characteristics (e.g., demographics, riding behavior, etc.) in similar situations (e.g., when encountering similar slopes, surface types, and/or surface conditions) to determine how to configure and/or engage the brakes. For example, if rider 404 has historically over-engaged the front brake while on a downhill slope, the systems described herein may reduce the engagement of the front brake to compensate in response to determining that rider 404 is traversing a location with a downhill slope. Additionally or alternatively, the systems described herein may record the braking behavior of rider 404 to add to a reaction database, such as reaction database 306 in FIG. 3.

Figure 5:
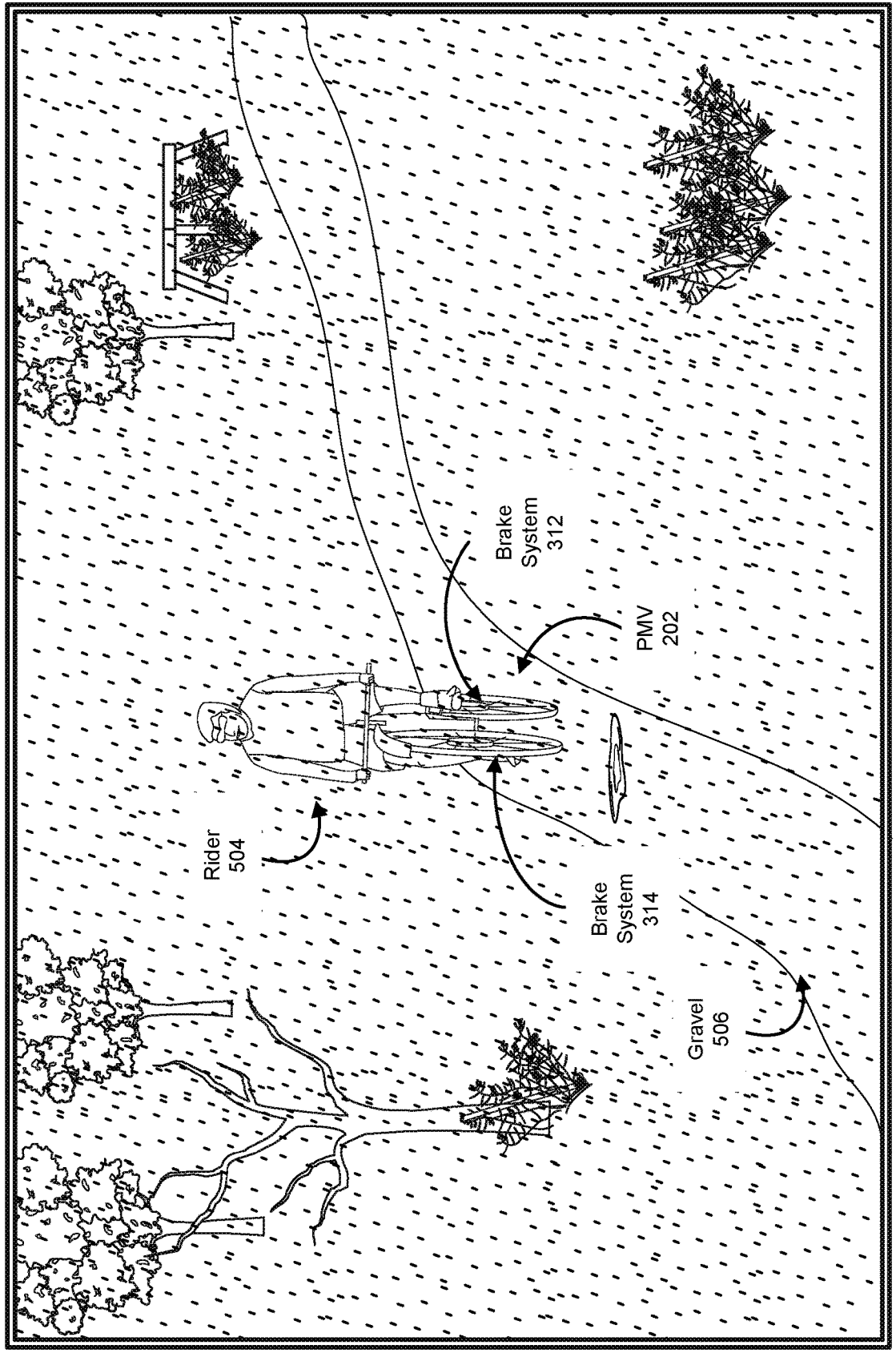
FIG. 5 is an illustration of an example personal mobility vehicle in environmental context relevant to braking.

FIG. 5 illustrates an example rider of a PMV in a context relevant to braking. In one example, a rider 504 of PMV 202 may attempt to slow down while in adverse environmental conditions, such as rain. In some examples, the systems described herein may use the location of PMV 202 to determine that PMV 202 is currently traversing gravel 506 that has poor traction and/or other surface conditions relevant to traction. In some embodiments, the systems described herein may detect that the rain is further reducing traction via sensors on PMV 202 (e.g., a camera and/or hygrometer) and/or map data (e.g., by determining that it is currently raining in the location and/or frequently rains in the location during this season). In one embodiment, the systems described herein may designate rain as a dynamic braking-related attribute that is sometimes present in a location and may require confirmation from sensors. In some examples, in response to determining that PMV 202 is in a low-traction situation, the systems described herein may increase the frequency with which an anti-locking braking system is applied to brake system 312 and/or brake system 314 in order to decrease the risk of sliding. The terms "sliding" and/or "skidding," as used herein, may generally refer to any situation in which one or more wheels of a vehicle have little or no traction and are not gripping the riding surface sufficiently well to enable effective braking and/or steering. In some examples, sliding may include hydroplaning (i.e., completely losing traction due to water under the wheels). For example, the anti-lock braking system may be configured to engage the brakes for a set number of milliseconds and then disengage the brakes for a set number of milliseconds under normal (e.g., moderate traction) braking circumstances and the systems described herein may increase the frequency of the cycle and/or decrease the span of time during which the brakes are engaged in response to detecting the low-traction conditions. In some examples, the systems described herein may determine from map data that PMV 202 is traversing a level surface and may, in response to the lack of slope combined with the low traction, engage both the front and rear brakes equally (rather than engaging the rear brake more strongly).

Figure 6:
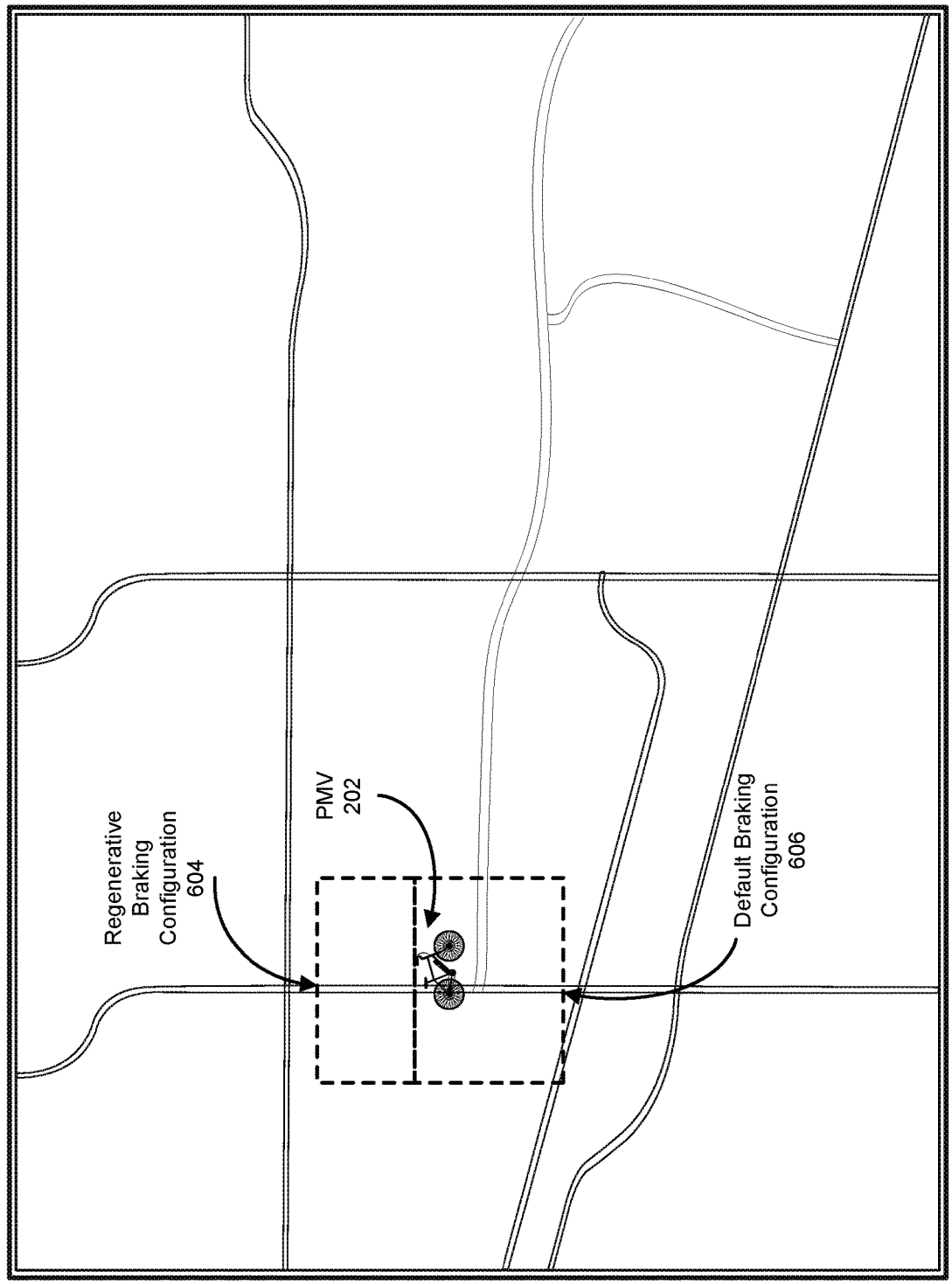
FIG. 6 is an illustration of an example braking map.

FIG. 6 illustrates an example braking map with different braking configurations in different areas. In some embodiments, the systems described herein may generate, store, and/or query a braking map that is separated into multiple subsections such that each subsection is associated with one or more braking configurations. For example, if the systems described herein determine that PMV 202 is located within the subsection designated for regenerative braking configuration 604, the systems described herein may send instructions to PMV 202 to activate regenerative braking. Similarly, if the systems described herein determine that PMV 202 is located in default braking configuration 606, the systems described herein may send instructions to PMV 202 to use a default braking configuration (e.g., braking more strongly with the rear wheel brakes than the front wheel brakes and engaging anti-lock braking only if a skid is detected).

The systems described herein may determine the location of PMV 202 relative to the braking map in a variety of ways. For example, the systems described herein may use a location service of PMV 202 (e.g., GPS). Additionally or alternatively, the systems described herein may have information about the current destination of PMV 202 (e.g., because PMV 202 is fulfilling a request to transport the rider to that destination as part of a dynamic transportation matching system) and may extrapolate the route of PMV 202 based on the destination. In some examples, the systems described herein may have information about the expected route of PMV 202 (e.g., because a suggested route is generated by the dynamic transportation matching system and sent to PMV 202 and/or a mobile device currently associated with PMV 202). The systems described herein may correlate the geographic location of PMV 202 with the location of PMV 202 on the braking map in a variety of ways. For example, the systems described herein may determine that PMV 202 is located within a particular segment, subsection, and/or region of the map with defined characteristics (e.g., regenerative braking configuration 604). Additionally or alternatively, the systems described herein may determine that PMV 202 is within a threshold distance of a location on the braking map. In some embodiments, geographic real-world locations may directly correlate with locations on the braking map and the systems described herein may locate PMV 202 on the braking map based directly on the geographic location of PMV 202. In some embodiments, the systems described herein may send information to a mobile device currently associated with PMV 202, such as a suggested route and/or suggested braking configurations. For example, the systems described herein may instruct the mobile device to display words and/or play audio instructing the rider to engage regenerative braking when on a downhill slope.

Figure 7:
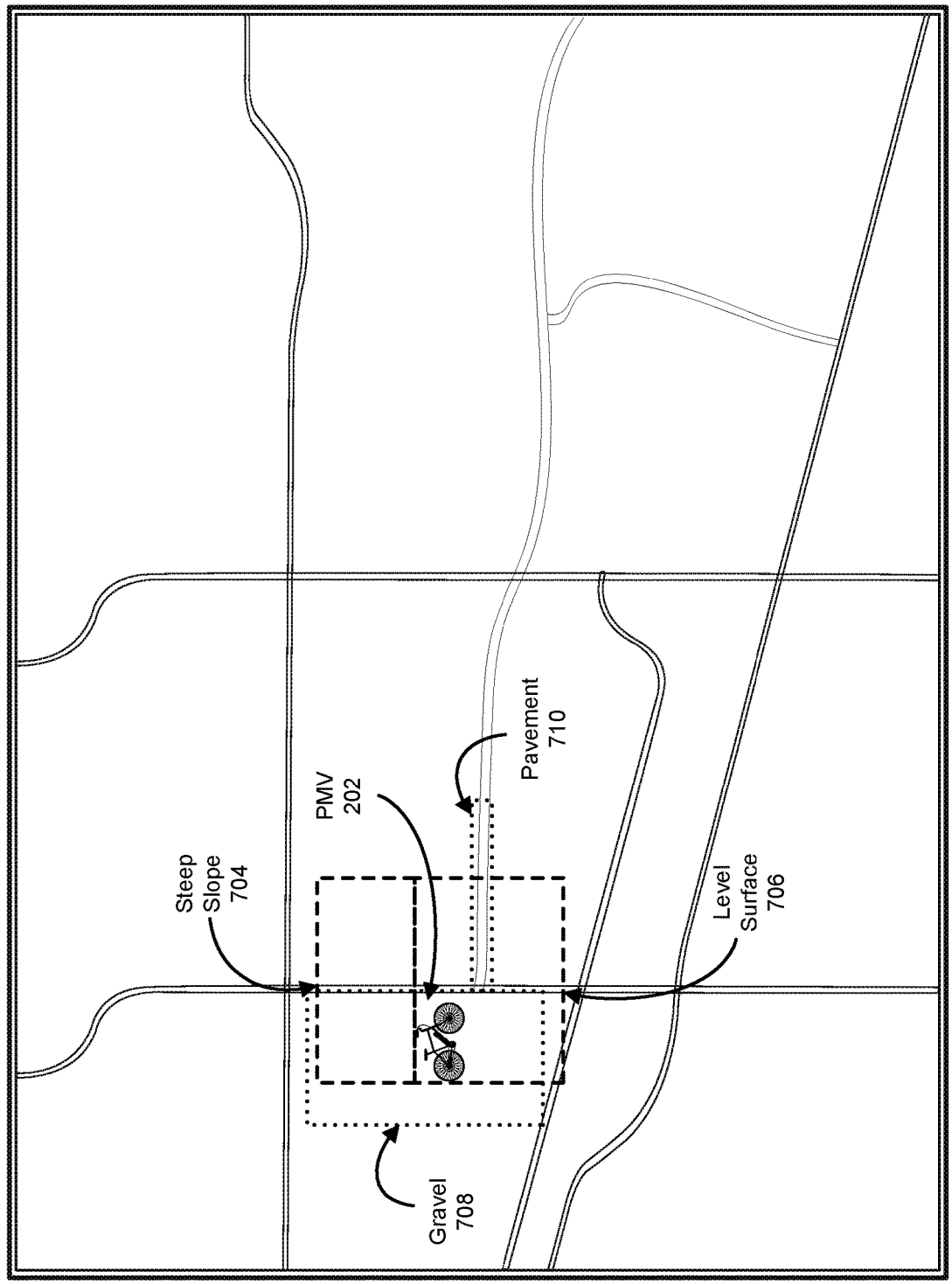
FIG. 7 is an illustration of an example braking map.

FIG. 7 illustrates an example braking map with different braking-related attributes recorded in different areas. In some embodiments, the systems described herein may record braking-related on a braking map and may send these braking-related attributes to a PMV when queried and/or may generate braking configurations based on the combination of braking-related attributes present at a given location. For example, PMV 202 may be traversing a location that is recorded on the braking map as containing gravel 708 and a level surface 706. In some examples, the systems described herein may not engage regenerative braking due to the level surface 706 and/or may calibrate the frequency of anti-lock brake engagement based in part on the presence of gravel 708. In other examples, if PMV 202 were traversing the overlap of steep slope 704 and gravel 708, the systems described herein may configure and/or engage the brakes of PMV 202 in a configuration designed to minimize skidding and/or tipping under such conditions (e.g., by applying the rear brake more heavily than the front brake). In one example, if PMV 202 were traversing pavement 710 and level surface 706, the systems described herein may apply a default braking configuration and/or a braking configuration optimized for stopping quickly in a high-traction situation.

Figure 8:
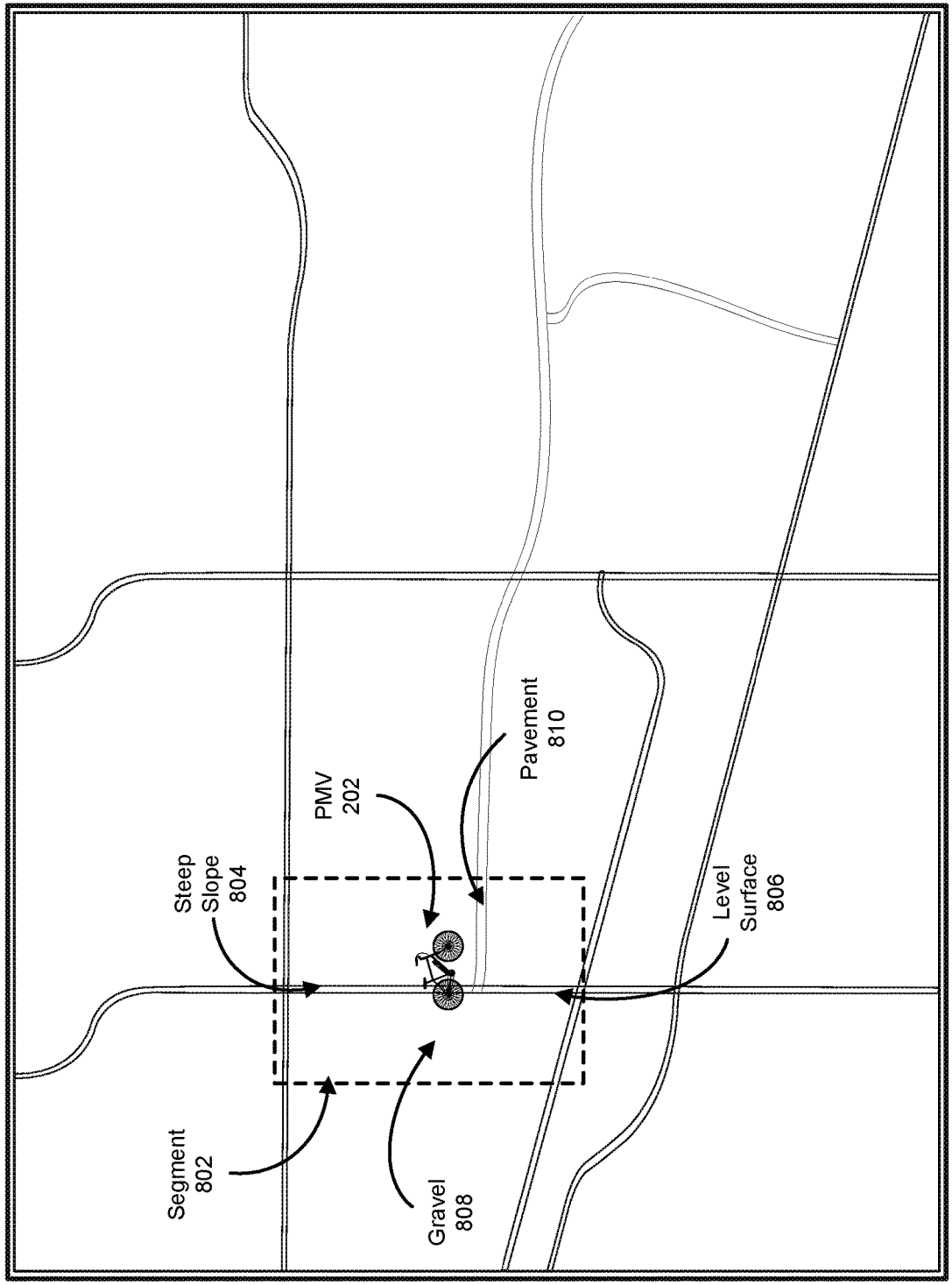
FIG. 8 is an illustration of an example braking map.

FIG. 8 illustrates an example braking map with a map segment that includes multiple braking-related attributes. In some embodiments, map segments on a braking map may have boundaries that do not directly correlate with the boundaries of areas of braking-related attributes. In some examples, map segments may represent geographic areas of a defined size. For example, a map segment may be a rectangle or square the size of a city block. Additionally or alternatively, a map segment may be a circle with a defined radius, such as half a mile or one mile. In another example, a map segment may be correlated with geographic landmarks, such as the boundaries of a park. In one example, a segment 802 may include an area of steep slope 804 as well as an area of level surface 806. Additionally or alternatively, segment 802 may include multiple surface types and/or surface conditions, such as an area of gravel 808 as well as an area of pavement 810. In some embodiments, the systems described herein may generate a braking configuration capable of handling different braking-related attributes both present in a segment. For example, the systems described herein may instruct PMV 202 to engage anti-lock brakes at a frequency that is suitable for avoiding skidding on gravel 808 but does not greatly diminish braking distance if employed on pavement 810. Additionally or alternatively, the systems described herein may average braking-related conditions found in a map segment to determine a braking configuration. For example, the systems described herein may average steep slope 804 and level surface 806 and instruct PMV 202 to brake as if on a mild slope. In some examples, a map segment may have more than two values for a braking-related attribute. For example, a map segment may include an area of level ground, an area of mild slope, and an area of steep slope. In some embodiments, the systems described herein may determine a braking configuration that is safe for any value of the braking-related attribute found within the map segment.

Figure 9:
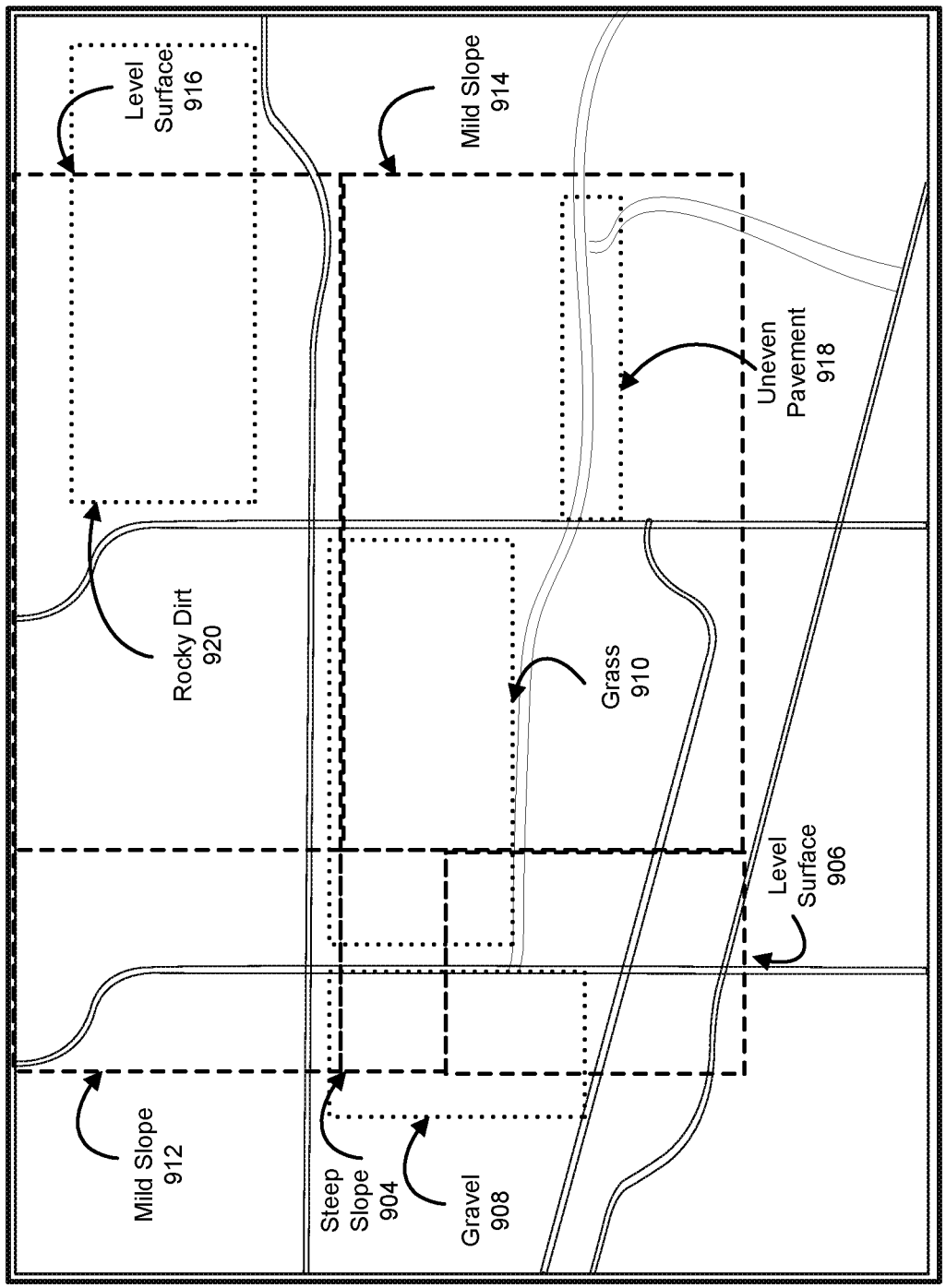
FIG. 9 is an illustration of an example braking map.

FIG. 9 illustrates an example braking map with multiple overlapping segments that describe different types of braking-related attributes. In some examples, the systems described herein may generate and/or store braking maps that cover a large portion of a geographic region. In one example, a brake map may have recorded areas of mild slope 912, steep slope 904, level surface 906, level surface 916, and/or mild slope 914. In addition to the slope data, the brake map may have recorded various different surface types and/or surface conditions such as areas of gravel 908, grass 910, uneven pavement 918, and/or rocky dirt 920 that may partially or entirely overlap with different areas of slope information. For example, if a PMV is traversing the overlap between steep slope 904 and gravel 908, the systems described herein may configure the brakes differently than if the PMV is traversing the overlap between gravel 908 and level surface 906 and/or differently than if the PMV is traversing the overlap between steep slope 904 and grass 910. In some embodiments, areas on the brake map may have an organic shape that conforms to the shapes of physical landmarks. For example, in some embodiments uneven pavement 910 may follow the contours of the path rather than being a rectangle that roughly outlines the shape of the path. In some embodiments, the systems described herein may extrapolate data from nearby areas when sufficient data to make a determination on local conditions has not yet been collected. For example, the systems described herein may assume that areas adjacent to mild slope 914 for which insufficient data has been collected may also have a mild slope.

Figure 10:
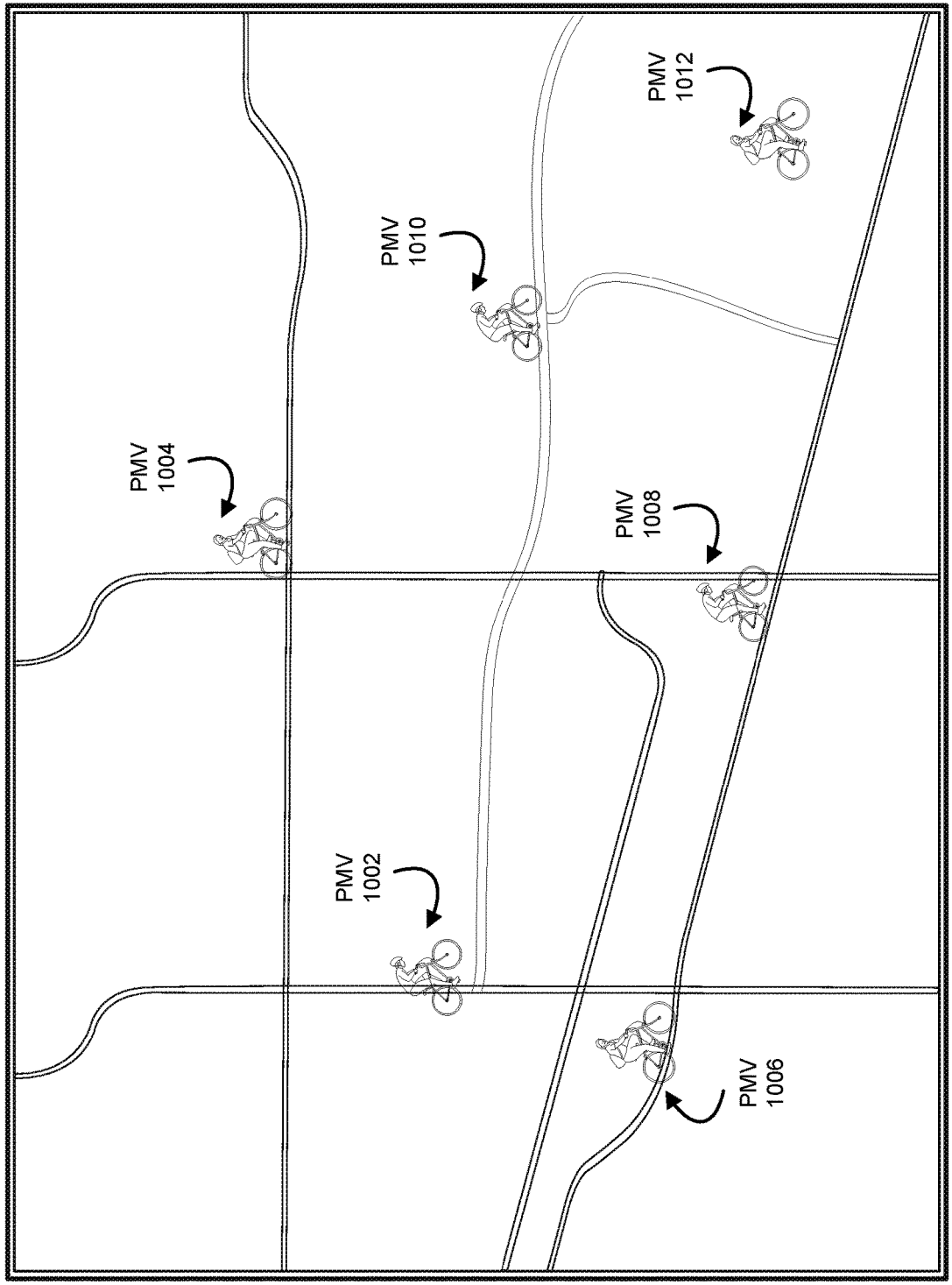
FIG. 10 is an illustration of an example fleet of personal mobility vehicles collecting data for a braking map.

FIG. 10 illustrates an example fleet of PMVs capable of collecting data for and/or using data from braking maps. In one example, PMVs 1002, 1004, 1006, 1008, 1010, and/or 1012 may be deployed in the same geographic region and may collect data about braking-related attributes while traversing locations within the geographic region. For example, PMV 1002 may detect that there is a downhill slope in one location and PMV 1006 may later use that data to engage regenerative braking in that location. In some embodiment, the systems described herein may track PMV usage data at various locations to identify braking-related attributes and/or create braking configurations. For example, if the systems describe determine that riders of PMVs typically apply brakes for a prolonged period of time at a given location in a given direction, the systems described herein may determine that that location has a steep slope and may instruct PMVs to apply regenerative braking when traversing the slope in the downhill direction.

In some embodiments, PMVs may collect information on braking-related attributes at various locations using sensors such as accelerometers, hygrometers, cameras, and/or any other suitable sensor for collecting environmental data. In one embodiment, PMV may be equipped with a camera such that the camera captures still images at the extremes of periodic motion caused by the PMV where there is minimal motion of the camera relative to the PMV, enabling the camera to capture relatively clear images. Additionally or alternatively, a camera on a PMV may capture a series of still images via a rolling shutter. In one example, the systems described herein may use camera, accelerometer, and/or other data to determine the conditions of road surface (e.g., whether pavement is smooth and even or cracked).

Figure 11B:
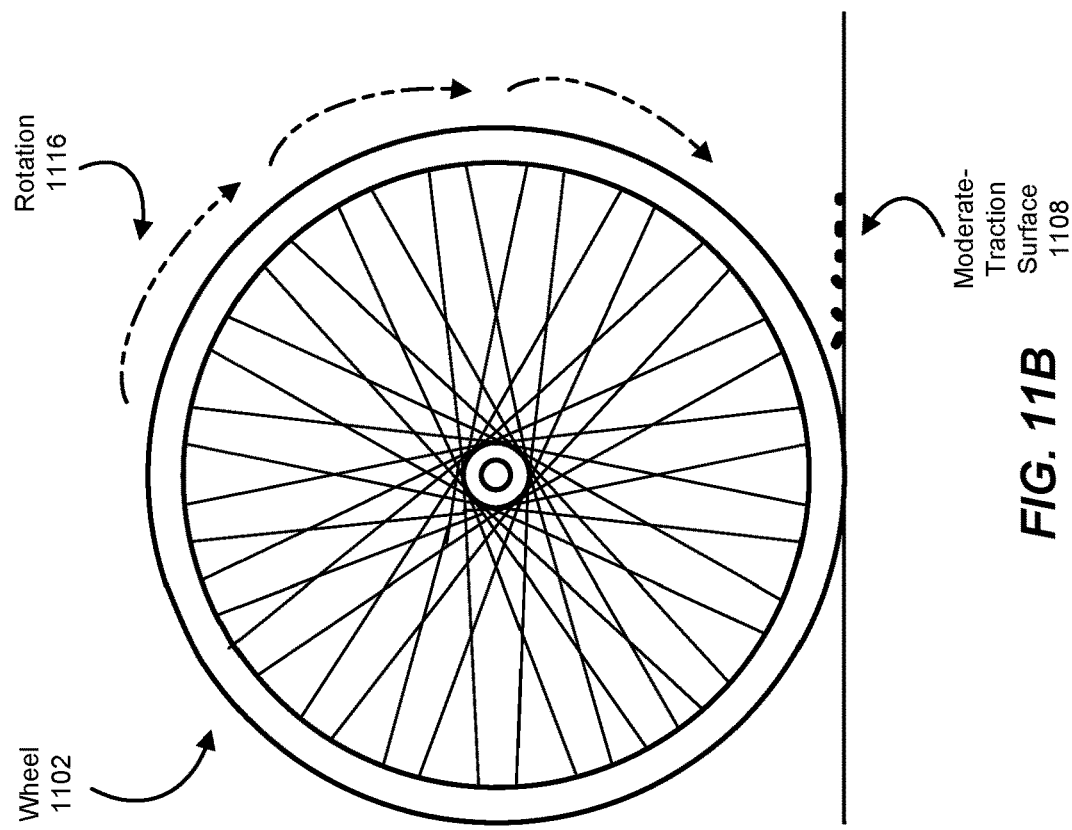
FIGS. 11A and 11B are illustrations of an example anti-lock braking system for a personal mobility vehicle.
Figure 11A:
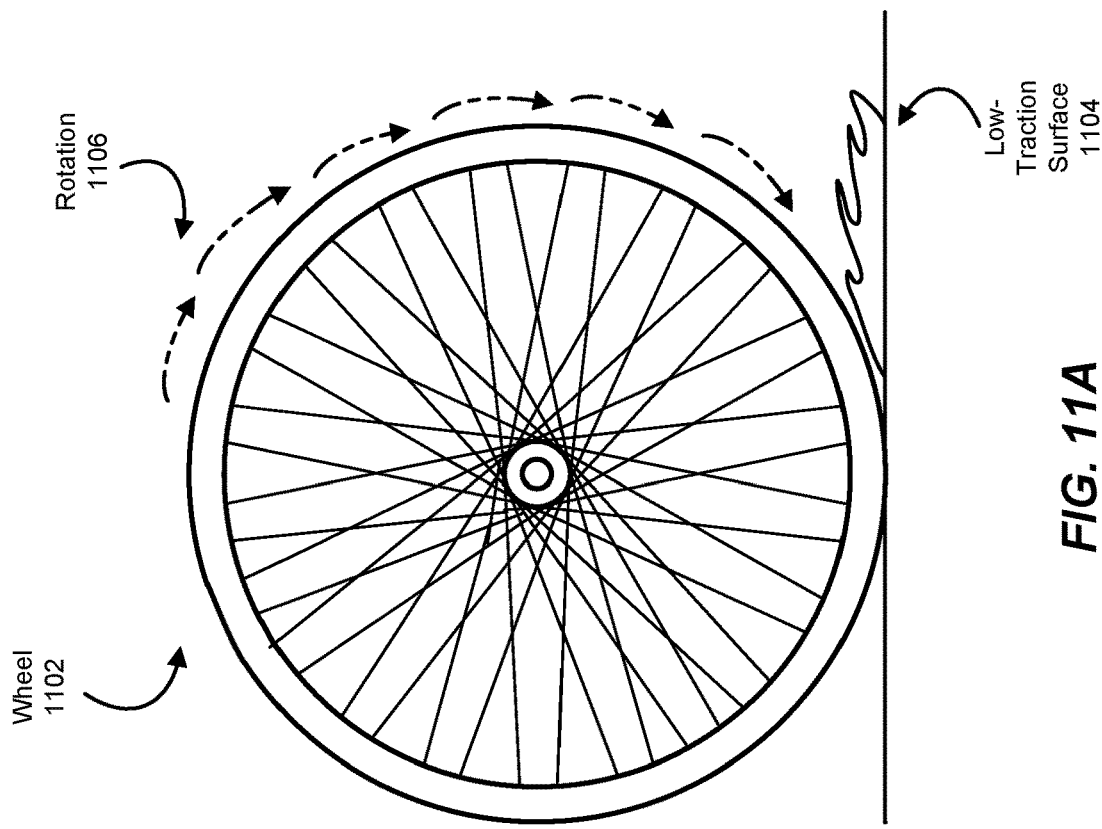

FIGS. 11A and 11B illustrate an example anti-lock braking system for a PMV. In some embodiments, different configurations of the braking system of a PMV may include different anti-lock braking configurations. In some examples, as illustrated in FIG. 11A, a wheel 1102 of a PMV may encounter a low-traction surface 1104 such as gravel, grass, loose dirt, water, ice, and/or any other type of surface condition with poor traction. In one embodiment, rotation 1106 of wheel 1102 may be periodically interrupted by the application of a brake. In some embodiments, an anti-lock braking system may alternately engage and disengage one or more brakes to slow down a PMV without causing the wheels to lock up and skid, slide, and/or hydroplane. For example, the anti-lock braking system may engage and disengage the brakes fifteen times per second. Additionally or alternatively, the anti-lock braking system may engage and disengage the brakes five times a second, ten times a second, twenty times a second, and/or any other suitable number of times. In one embodiment, the systems described herein may calculate a frequency for the engage-disengage cycle of the anti-lock brake system based on one or more braking-related conditions such as surface traction, rider weight distribution, tire tread wear, previous rider braking behavior, and/or other conditions. In some examples, the systems described herein may calculate a shorter engage-disengage cycle and/or an engage-disengage cycle with less brake engagement time than otherwise in response to detecting lower traction surface conditions and/or may calculate a longer engage-disengage cycler and/or an engage-disengage cycle with more brake engagement time in response to detecting higher traction surface conditions. For example, as illustrated in FIG. 11B, wheel 1102 may encounter a moderate-traction surface 1108 such as loose rocks and the systems described herein may determine an anti-lock braking frequency that results in a rotation 1116. In one example, when wheel 1102 encounters low-traction surface 1104, the systems described herein may engage brakes 15 times per second, while when wheel 1102 encounters moderate-traction surface 1108, the systems described herein may engage brakes 8 times per second.

Figure 12:
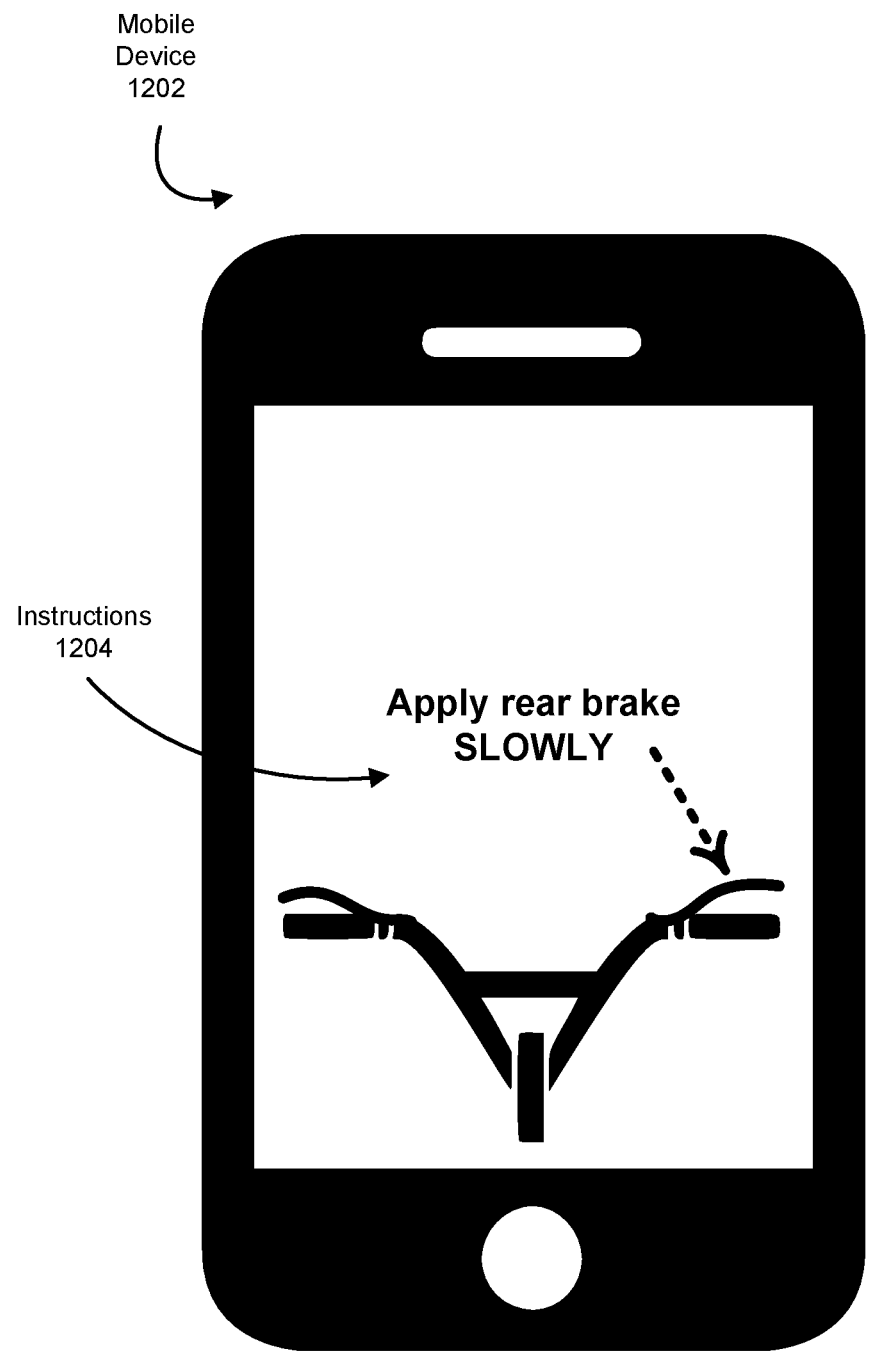
FIG. 12 is an illustration of example braking-related information displayed on a mobile device.

FIG. 12 illustrates example braking-related information displayed on a mobile device. In one example, the systems described herein may determine, based on braking-related conditions, that slowly applying force to the rear brake will slow down the PMV with a minimal risk of sliding, skidding, and/or tipping. In one example, the systems described herein may determine that a mobile device 1202 is associated with the PMV and may send braking-related information 1204 to mobile device 1202 that suggests that the rider of the PMV apply the rear brake slowly and/or directs the rider of the PMV to apply pressure to the brake lever associated with the rear brake. In one embodiment, a server may determine braking instructions and/or may determine braking-related information 1204 to send to mobile device 1202 based on the braking instructions. For example, if the braking instructions prompt the PMV to engage the rear brake, braking-related information 1204 may prompt the user to apply force to the brake lever that engages the rear brake. In some examples, a server may send braking-related information 1204 to mobile device 1202 in lieu of sending the braking instructions to the PMV. In some embodiments, the systems described herein may prompt the mobile device to output audio information, such as the words "apply rear brake slowly." In some examples, the systems described herein may send braking-related information that prompts the rider to apply one or both brakes at varying levels of force and/or speed. For example, the systems described herein may cause mobile device 1202 braking-related information that suggests that the rider apply moderate force to the right brake lever and light force to the left brake lever.

Figure 13:
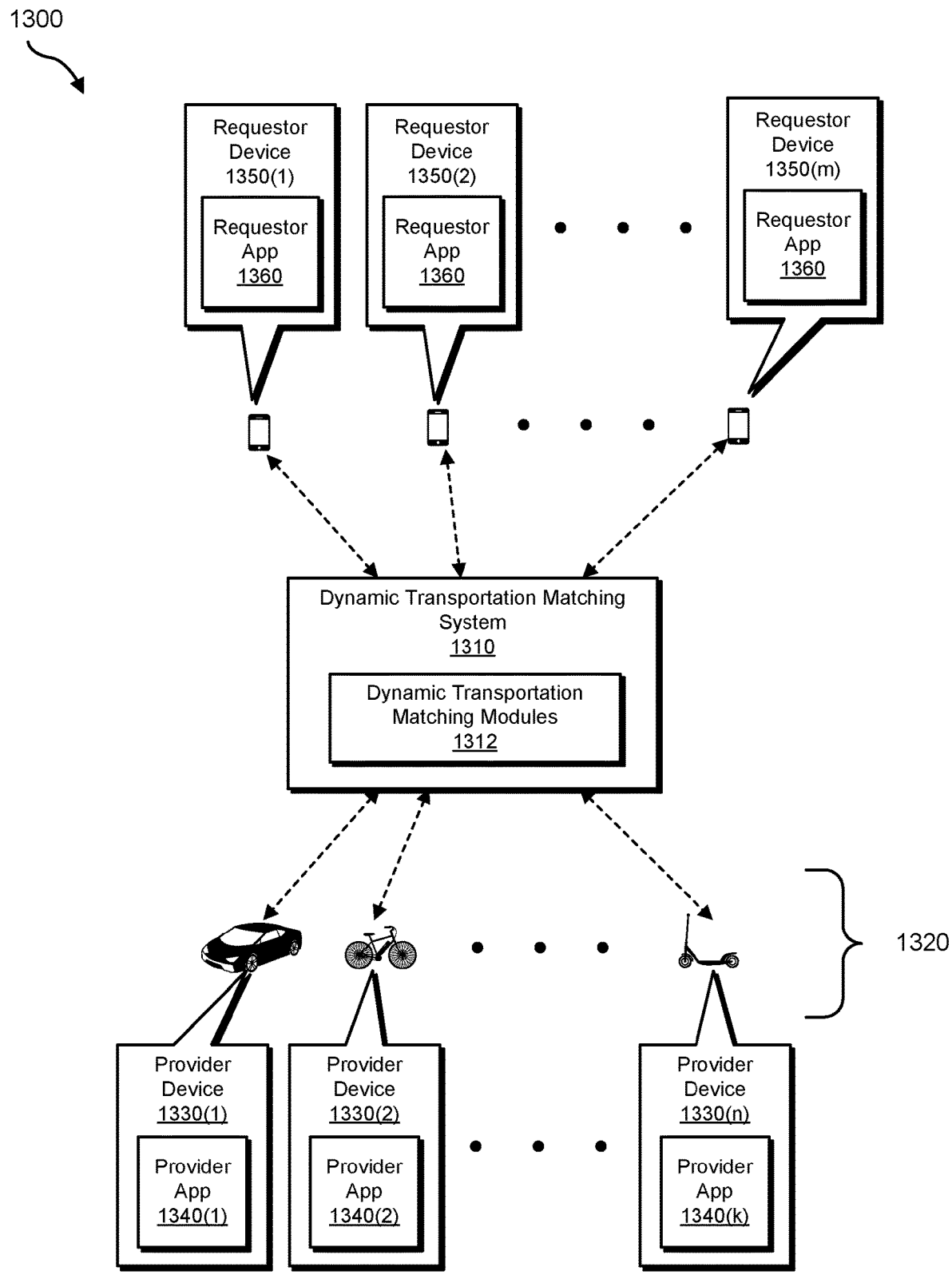
FIG. 13 is a block diagram of an example system for matching transportation requests with a dynamic transportation network that includes personal mobility vehicles.

FIG. 13 illustrates an example system 1300 for matching transportation requests with a dynamic transportation network that includes personal mobility vehicles. As shown in FIG. 13, a dynamic transportation matching system 1310 may be configured with one or more dynamic transportation matching modules 1312 that may perform one or more of the steps described herein. Dynamic transportation matching system 1310 may represent any computing system and/or set of computing systems capable of matching transportation requests. Dynamic transportation matching system 1310 may be in communication with computing devices in each of a group of vehicles 1320. Vehicles 1320 may represent any vehicles that may fulfill transportation requests. In some examples, vehicles 1320 may include disparate vehicle types and/or models. For example, vehicles 1320 may include road-going vehicles and personal mobility vehicles. In some examples, some of vehicles 1320 may be standard commercially available vehicles. According to some examples, some of vehicles 1320 may be owned by separate individuals (e.g., transportation providers). Furthermore, while, in some examples, many or all of vehicles 1320 may be human-operated, in some examples many of vehicles 1320 may also be autonomous (or partly autonomous). Accordingly, throughout the instant disclosure, references to a "transportation provider" (or "provider") may, where appropriate, refer to an operator of a human driven vehicle, an autonomous vehicle control system, an autonomous vehicle, an owner of an autonomous vehicle, an operator of an autonomous vehicle, an attendant of an autonomous vehicle, a vehicle piloted by a requestor, and/or an autonomous system for piloting a vehicle. While FIG. 13 does not specify the number of vehicles 1320, it may be readily appreciated that the systems described herein are applicable to hundreds of vehicles, thousands of vehicles, or more. In one example, dynamic transportation matching system 1310 may coordinate transportation matchings within a single region for 50,000 vehicles or more on a given day. In some examples, vehicles 1320 may collectively form a dynamic transportation network that may provide transportation supply on an on-demand basis to transportation requestors.

As mentioned above, dynamic transportation matching system 1310 may communicate with computing devices in each of vehicles 1320. The computing devices may be any suitable type of computing device. In some examples, one or more of the computing devices may be integrated into the respective vehicles 1320. In some examples, one or more of the computing devices may be mobile devices. For example, one or more of the computing devices may be smartphones. Additionally or alternatively, one or more of the computing devices may be tablet computers, personal digital assistants, or any other type or form of mobile computing device. According to some examples, one or more of the computing devices may include wearable computing devices (e.g., a driver-wearable computing device), such as smart glasses, smart watches, etc. In some examples, one or more of the computing devices may be devices suitable for temporarily mounting in a vehicle (e.g., for use by a requestor and/or provider for a transportation matching application, a navigation application, and/or any other application suited for the use of requestors and/or providers). Additionally or alternatively, one or more of the computing devices may be devices suitable for installing in a vehicle and/or may be a vehicle's computer that has a transportation management system application installed on the computer in order to provide transportation services to transportation requestors and/or communicate with dynamic transportation matching system 1310.

As shown in FIG. 13, vehicles 1320 may include provider devices 1330(1)-(n) (e.g., whether integrated into the vehicle, permanently affixed to the vehicle, temporarily affixed to the vehicle, worn by a driver of the vehicle, etc.). In some examples, provider devices 1330 may include a provider apps 1340(1)-(k). Provider apps 1340(1)-(k) may represent any application, program, and/or module that may provide one or more services related to operating a vehicle and/or providing transportation matching services. For example, provider apps 1340(1)-(k) may include a transportation matching application for providers and/or one or more applications for matching personal mobility vehicles (PMVs) with requestor devices. In some embodiments, different types of provider vehicles may be provisioned with different types of provider devices and/or different provider applications. For example, PMVs may be provisioned with provider devices that are configured with a provider application that enables transportation requestors to reserve and/or operate the PMV while road-constrained vehicles (e.g., cars) may be provisioned with provider devices that are configured with a provider application that enables provider vehicle operators (e.g., transportation providers) to respond to requests from transportation requestors. In some examples, provider applications 1340(1)-(k) may match the user of provider apps 1340(1)-(k) (e.g., a transportation provider) with transportation requestors through communication with dynamic transportation matching system 1310. In addition, and as is described in greater detail below, provider apps 1340(1)-(k) may provide dynamic transportation management system 1310 with information about a provider (including, e.g., the current location of the provider and/or vehicle) to enable dynamic transportation management system 1310 to provide dynamic transportation matching and/or management services for the provider and one or more requestors. In some examples, provider apps 1340(1)-(k) may coordinate communications and/or a payment between a requestor and a provider. According to some embodiments, provider apps 1340(1)-(k) may provide a map service, a navigation service, a traffic notification service, and/or a geolocation service.

Additionally, as shown in FIG. 13, dynamic transportation matching system 1310 may communicate with requestor devices 1350(1)-(m). In some examples, requestor devices 1350 may include a requestor app 1360. Requestor app 1360 may represent any application, program, and/or module that may provide one or more services related to requesting transportation matching services. For example, requestor app 1360 may include a transportation matching application for requestors. In some examples, requestor app 1360 may match the user of requestor app 1360 (e.g., a transportation requestor) with transportation providers through communication with dynamic transportation matching system 1310. In addition, and as is described in greater detail below, requestor app 1360 may provide dynamic transportation management system 1310 with information about a requestor (including, e.g., the current location of the requestor) to enable dynamic transportation management system 1310 to provide dynamic transportation matching services for the requestor and one or more providers. In some examples, requestor app 1360 may coordinate communications and/or a payment between a requestor and a provider. According to some embodiments, requestor app 1360 may provide a map service, a navigation service, a traffic notification service, and/or a geolocation service.

Embodiments of the instant disclosure may include or be implemented in conjunction with a dynamic transportation matching system. A transportation matching system may arrange transportation on an on-demand and/or ad-hoc basis by, e.g., matching one or more transportation requestors with one or more transportation providers. For example, a transportation matching system may provide one or more transportation matching services for a networked transportation service, a ridesourcing service, a taxicab service, a car-booking service, an autonomous vehicle service, a personal mobility vehicle service, or some combination and/or derivative thereof. The transportation matching system may include and/or interface with any of a variety of subsystems that may implement, support, and/or improve a transportation matching service. For example, the transportation matching system may include a matching system (e.g., that matches requestors to ride opportunities and/or that arranges for requestors and/or providers to meet), a mapping system, a navigation system (e.g., to help a provider reach a requestor, to help a requestor reach a provider, and/or to help a provider reach a destination), a reputation system (e.g., to rate and/or gauge the trustworthiness of a requestor and/or a provider), a payment system, and/or an autonomous or semi-autonomous driving system. The transportation matching system may be implemented on various platforms, including a requestor-owned mobile device, a computing system installed in a vehicle, a requestor-owned mobile device, a server computer system, or any other hardware platform capable of providing transportation matching services to one or more requestors and/or providers.

While various examples provided herein relate to transportation, embodiments of the instant disclosure may include or be implemented in conjunction with a dynamic matching system applied to one or more services instead of and/or in addition to transportation services. For example, embodiments described herein may be used to match service providers with service requestors for any service.

Figure 14:
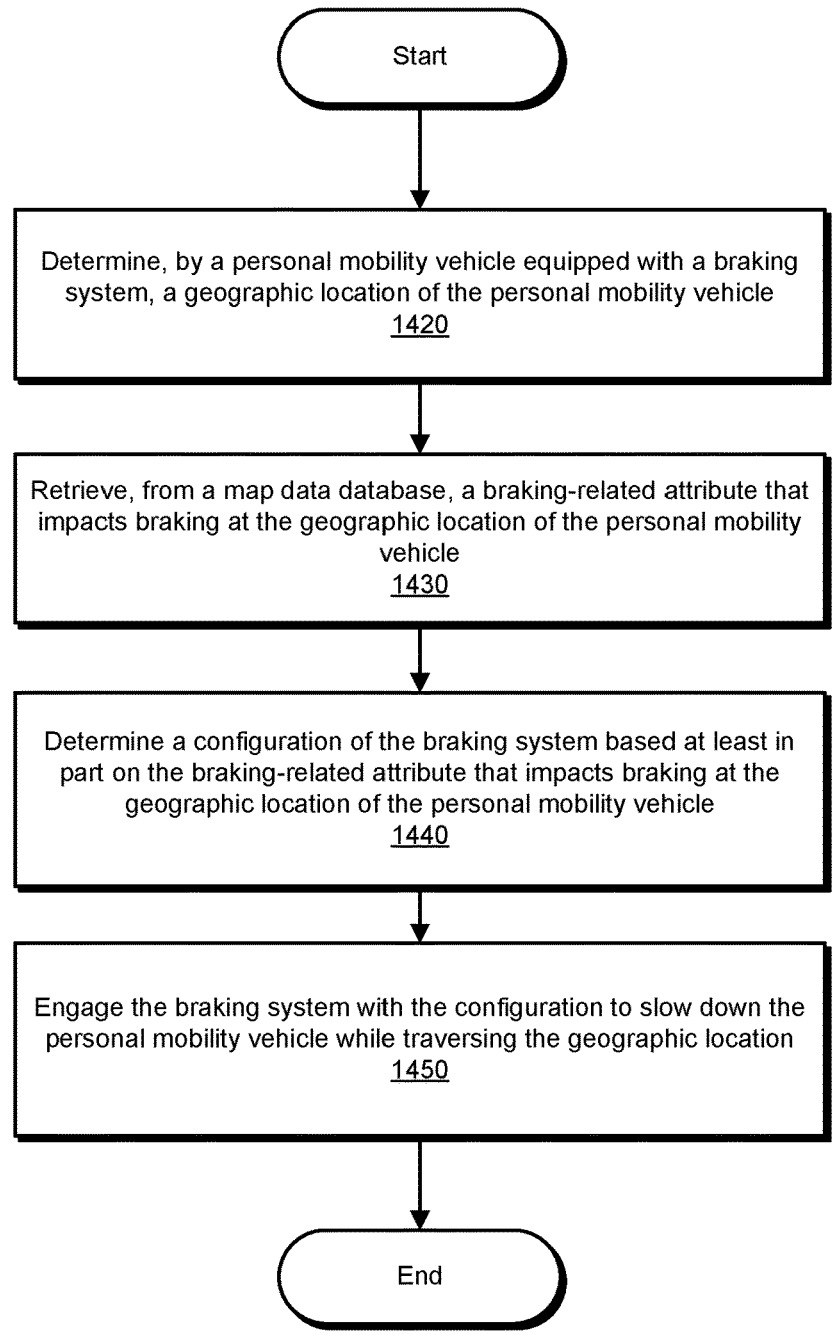
FIG. 14 is a flow diagram of an example method for configuring personal mobility vehicle brakes based on location.

FIG. 14 illustrates an example method 1400 for configuring brakes based on map data. As shown in FIG. 14, at step 1410, one or more of the systems described herein may identify a personal mobility vehicle equipped with a braking system. At step 1420, one or more of the systems described herein may determine a geographic location of the personal mobility vehicle.

At step 1430, one or more of the systems described herein may retrieve, from a map data database, a braking-related attribute that impacts braking at the geographic location of the personal mobility vehicle. In some examples, the systems described herein may include retrieving the braking-related attribute that impacts braking at the geographic location by averaging an incidence of the braking-related attribute over the geographic area of the defined size. For example, the systems described herein may retrieve a first value and a second value for the braking-related attribute within the geographic area and may average the first value and the second value to arrive at an average value of the braking-related attribute within the geographic area.

At step 1440, one or more of the systems described herein may determine a configuration of the braking system based at least in part on the braking-related attribute that impacts braking at the geographic location of the personal mobility vehicle.

In one embodiment, the braking-related attribute may include information indicating that the personal mobility vehicle is moving on a slope from a higher elevation to a lower elevation and determining the configuration of the braking system based at least in part on the braking-related attribute may include configuring the braking system to engage regenerative braking based at least in part on determining that the personal mobility vehicle is moving on the slope from the higher elevation to the lower elevation. Additionally or alternatively, the braking-related attribute that impacts braking at the geographic location of the personal mobility vehicle may include a dynamic attribute that is intermittently present at the geographic location and the systems described herein may retrieve information on a status of the dynamic attribute and determine the configuration of the braking system based at least in part on the braking-related attribute by determining the configuration of the braking system based at least in part on the status of the dynamic attribute.

In one embodiment, systems described herein may (i) observe at least one reaction of each of a plurality of riders of personal mobility vehicles to the braking-related attribute, (ii) record the at least one reaction of each of the plurality of riders to a reaction database, (iii) retrieve, from the reaction database, in response to retrieving the braking-related attribute from the map store, the at least one reaction to the braking-related attribute, and (iv) determine the configuration based at least in part on the at least one reaction of each of the plurality of riders of the personal mobility vehicles to the braking-related attribute.

In some examples, the systems described herein may determine the geographic location of the personal mobility vehicle by determining the geographic location to within a geographic segment of a defined size may retrieve the braking-related attribute that impacts braking at the geographic location by identifying two different values for the braking-related attribute within the geographic segment of the defined size. In some examples, the systems described herein may identify at least two different values. In some embodiments, the systems described herein may determine the configuration of the braking system based at least in part on the braking-related attribute by determining that the configuration is compatible with both of the two different values. In some examples, the systems described herein may determine a configuration of the braking system that is compatible with two or more values from a group of more than two values (e.g., two out of three possible values, three out of five possible values, etc.).

At step 1450, one or more of the systems described herein may engage the braking system with the configuration to slow down the personal mobility vehicle while traversing the geographic location. In some examples, the systems described herein may transmit, to a mobile device associated with the personal mobility vehicle, instructions to display braking-related information on the mobile device, wherein the braking-related information is based at least in part on the braking-related attribute.

In one embodiment, the systems described herein may (i) receive, by a server, information about the geographic location of the personal mobility vehicle, (ii) determine that the geographic location of the personal mobility vehicle is associated with one or more locations on a braking map, (iii) determine one or more braking instructions associated with the one or more locations on the braking map, and (iv) transmit the one or more braking instructions to the personal mobility vehicle, where the personal mobility vehicle is configured to execute the one or more braking instructions to slow down the personal mobility.

In one embodiment, the systems described herein may determine, by the server, one or more surface conditions associated with the one or more locations on the braking map, where the one or more braking instructions are determined based at least on the one or more surface conditions and where the one or more braking instructions are configured to slow down the personal mobility vehicle without sliding on ground surfaces while traversing the geographic location.

In one embodiment, systems described herein may identify a front wheel braking system and a rear wheel braking system and determine a distribution differential between the front wheel braking system and the rear wheel braking system based at least in part on the braking-related attribute.

In one embodiment, the systems described herein may (i) identify a rider of the personal mobility vehicle who is traversing the geographic location via the personal mobility vehicle, (ii) retrieve a record of at least one previous reaction of the rider of the personal mobility vehicle to the braking-related attribute, and (iii) determine the configuration based at least in part on the record of the at least one previous reaction of the rider of the personal mobility vehicle to the braking-related attribute.

In some embodiments, the systems described herein may detect, by at least one sensor of the personal mobility vehicle, a second braking-related attribute at a second geographic location and send, to the map data database, the second braking-related attribute detected at the second geographic location for later retrieval by an additional personal mobility vehicle traversing the geographic location. In one embodiment, the braking system may include a front brake and a rear brake and determining the configuration may include determining a front brake instruction for the front brake and a rear brake instruction for the rear brake, where the front brake instruction and the rear brake instruction causes the front brake and the rear brake to slow down the personal mobility vehicle without sliding on ground surfaces while traversing the geographic location.

Figure 15:
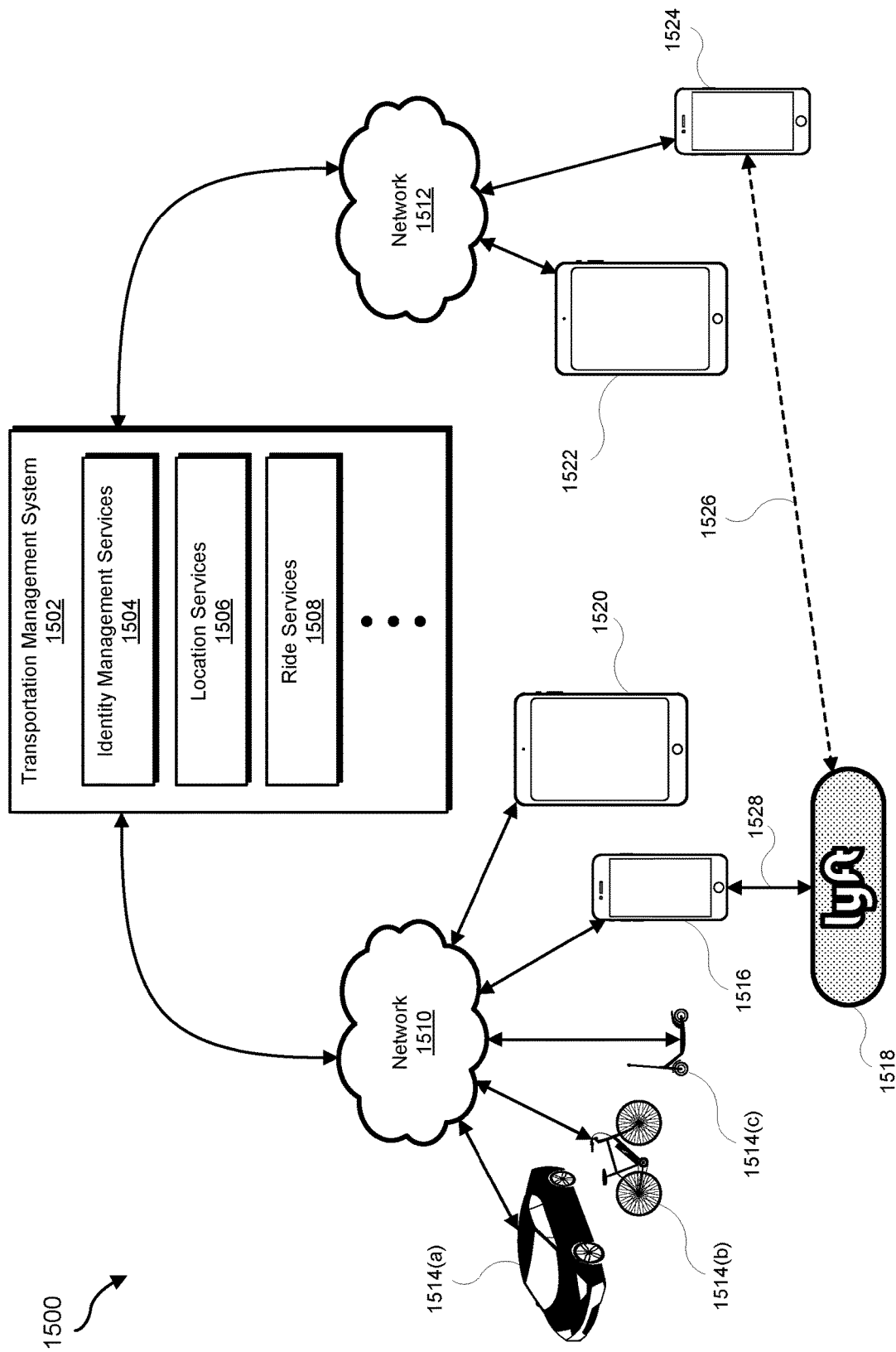
FIG. 15 is an illustration of an example requestor/provider management environment.

FIG. 15 shows a transportation management environment 1500, in accordance with various embodiments. As shown in FIG. 15, a transportation management system 1502 may run one or more services and/or software applications, including identity management services 1504, location services 1506, ride services 1508, and/or other services. Although FIG. 15 shows a certain number of services provided by transportation management system 1502, more or fewer services may be provided in various implementations. In addition, although FIG. 15 shows these services as being provided by transportation management system 1502, all or a portion of any of the services may be processed in a distributed fashion. For example, computations associated with a service task may be performed by a combination of transportation management system 1502 (including any number of servers, databases, etc.), one or more devices associated with a provider (e.g., devices integrated with managed vehicles 1514(a), 1514(b), and/or 1514(c); provider computing devices 1516 and tablets 1520; and transportation management vehicle devices 1518), and/or more or more devices associated with a ride requestor (e.g., the requestor's computing devices 1524 and tablets 1522). In some embodiments, transportation management system 1502 may include one or more general purpose computers, server computers, clustered computing systems, cloud-based computing systems, and/or any other computing systems or arrangements of computing systems. Transportation management system 1502 may be configured to run any or all of the services and/or software components described herein. In some embodiments, the transportation management system 1502 may include an appropriate operating system and/or various server applications, such as web servers capable of handling hypertext transport protocol (HTTP) requests, file transfer protocol (FTP) servers, database servers, etc.

In some embodiments, identity management services 1504 may be configured to perform authorization services for requestors and providers and/or manage their interactions and/or data with transportation management system 1502. This may include, e.g., authenticating the identity of providers and determining that they are authorized to provide services through transportation management system 1502. Similarly, requestors' identities may be authenticated to determine whether they are authorized to receive the requested services through transportation management system 1502. Identity management services 1504 may also manage and/or control access to provider and/or requestor data maintained by transportation management system 1502, such as driving and/or ride histories, vehicle data, personal data, preferences, usage patterns as a ride provider and/or as a ride requestor, profile pictures, linked third-party accounts (e.g., credentials for music and/or entertainment services, social-networking systems, calendar systems, task-management systems, etc.) and any other associated information. Transportation management system 1502 may also manage and/or control access to provider and/or requestor data stored with and/or obtained from third-party systems. For example, a requester or provider may grant transportation management system 1502 access to a third-party email, calendar, or task management system (e.g., via the user's credentials). As another example, a requestor or provider may grant, through a mobile device (e.g., 1516, 1520, 1522, or 1524), a transportation application associated with transportation management system 1502 access to data provided by other applications installed on the mobile device. In some examples, such data may be processed on the client and/or uploaded to transportation management system 1502 for processing.

In some embodiments, transportation management system 1502 may provide ride services 1508, which may include ride matching and/or management services to connect a requestor to a provider. For example, after identity management services module 1504 has authenticated the identity a ride requestor, ride services module 1508 may attempt to match the requestor with one or more ride providers. In some embodiments, ride services module 1508 may identify an appropriate provider using location data obtained from location services module 1506. Ride services module 1508 may use the location data to identify providers who are geographically close to the requestor (e.g., within a certain threshold distance or travel time) and/or who are otherwise a good match with the requestor. Ride services module 1508 may implement matching algorithms that score providers based on, e.g., preferences of providers and requestors; vehicle features, amenities, condition, and/or status; providers' preferred general travel direction and/or route, range of travel, and/or availability; requestors' origination and destination locations, time constraints, and/or vehicle feature needs; and any other pertinent information for matching requestors with providers. In some embodiments, ride services module 1508 may use rule-based algorithms and/or machine-learning models for matching requestors and providers.

Transportation management system 1502 may communicatively connect to various devices through networks 1510 and/or 1512. Networks 1510 and 1512 may include any combination of interconnected networks configured to send and/or receive data communications using various communication protocols and transmission technologies. In some embodiments, networks 1510 and/or 1512 may include local area networks (LANs), wide-area networks (WANs), and/or the Internet, and may support communication protocols such as transmission control protocol/Internet protocol (TCP/IP), Internet packet exchange (IPX), systems network architecture (SNA), and/or any other suitable network protocols. In some embodiments, data may be transmitted through networks 1510 and/or 1512 using a mobile network (such as a mobile telephone network, cellular network, satellite network, or other mobile network), a public switched telephone network (PSTN), wired communication protocols (e.g., Universal Serial Bus (USB), Controller Area Network (CAN)), and/or wireless communication protocols (e.g., wireless LAN (WLAN) technologies implementing the IEEE 1302.12 family of standards, Bluetooth, Bluetooth Low Energy, Near Field Communication (NFC), Z-Wave, and ZigBee). In various embodiments, networks 1510 and/or 1512 may include any combination of networks described herein or any other type of network capable of facilitating communication across networks 1510 and/or 1512.

In some embodiments, transportation management vehicle device 1518 may include a provider communication device configured to communicate with users, such as drivers, passengers, pedestrians, and/or other users. In some embodiments, transportation management vehicle device 1518 may communicate directly with transportation management system 1502 or through another provider computing device, such as provider computing device 1516. In some embodiments, a requestor computing device (e.g., device 1524) may communicate via a connection 1526 directly with transportation management vehicle device 1518 via a communication channel and/or connection, such as a peer-to-peer connection, Bluetooth connection, NFC connection, ad hoc wireless network, and/or any other communication channel or connection. Although FIG. 15 shows particular devices communicating with transportation management system 1502 over networks 1510 and 1512, in various embodiments, transportation management system 1502 may expose an interface, such as an application programming interface (API) or service provider interface (SPI) to enable various third parties which may serve as an intermediary between end users and transportation management system 1502.

In some embodiments, devices within a vehicle may be interconnected. For example, any combination of the following may be communicatively connected: vehicle 1514, provider computing device 1516, provider tablet 1520, transportation management vehicle device 1518, requestor computing device 1524, requestor tablet 1522, and any other device (e.g., smart watch, smart tags, etc.). For example, transportation management vehicle device 1518 may be communicatively connected to provider computing device 1516 and/or requestor computing device 1524. Transportation management vehicle device 1518 may establish communicative connections, such as connections 1526 and 1528, to those devices via any suitable communication technology, including, e.g., WLAN technologies implementing the IEEE 1302.12 family of standards, Bluetooth, Bluetooth Low Energy, NFC, Z-Wave, ZigBee, and any other suitable short-range wireless communication technology.

In some embodiments, users may utilize and interface with one or more services provided by the transportation management system 1502 using applications executing on their respective computing devices (e.g., 1516, 1518, 1520, and/or a computing device integrated within vehicle 1514), which may include mobile devices (e.g., an iPhone®, an iPad®, mobile telephone, tablet computer, a personal digital assistant (PDA)), laptops, wearable devices (e.g., smart watch, smart glasses, head mounted displays, etc.), thin client devices, gaming consoles, and any other computing devices. In some embodiments, vehicle 1514 may include a vehicle-integrated computing device, such as a vehicle navigation system, or other computing device integrated with the vehicle itself, such as the management system of an autonomous vehicle. The computing device may run on any suitable operating systems, such as Android®, iOS®, macOS®, Windows®, Linux®, UNIX®, or UNIX®-based or Linux®-based operating systems, or other operating systems. The computing device may further be configured to send and receive data over the Internet, short message service (SMS), email, and various other messaging applications and/or communication protocols. In some embodiments, one or more software applications may be installed on the computing device of a provider or requestor, including an application associated with transportation management system 1502. The transportation application may, for example, be distributed by an entity associated with the transportation management system via any distribution channel, such as an online source from which applications may be downloaded. Additional third-party applications unassociated with the transportation management system may also be installed on the computing device. In some embodiments, the transportation application may communicate or share data and resources with one or more of the installed third-party applications.

Figure 16:
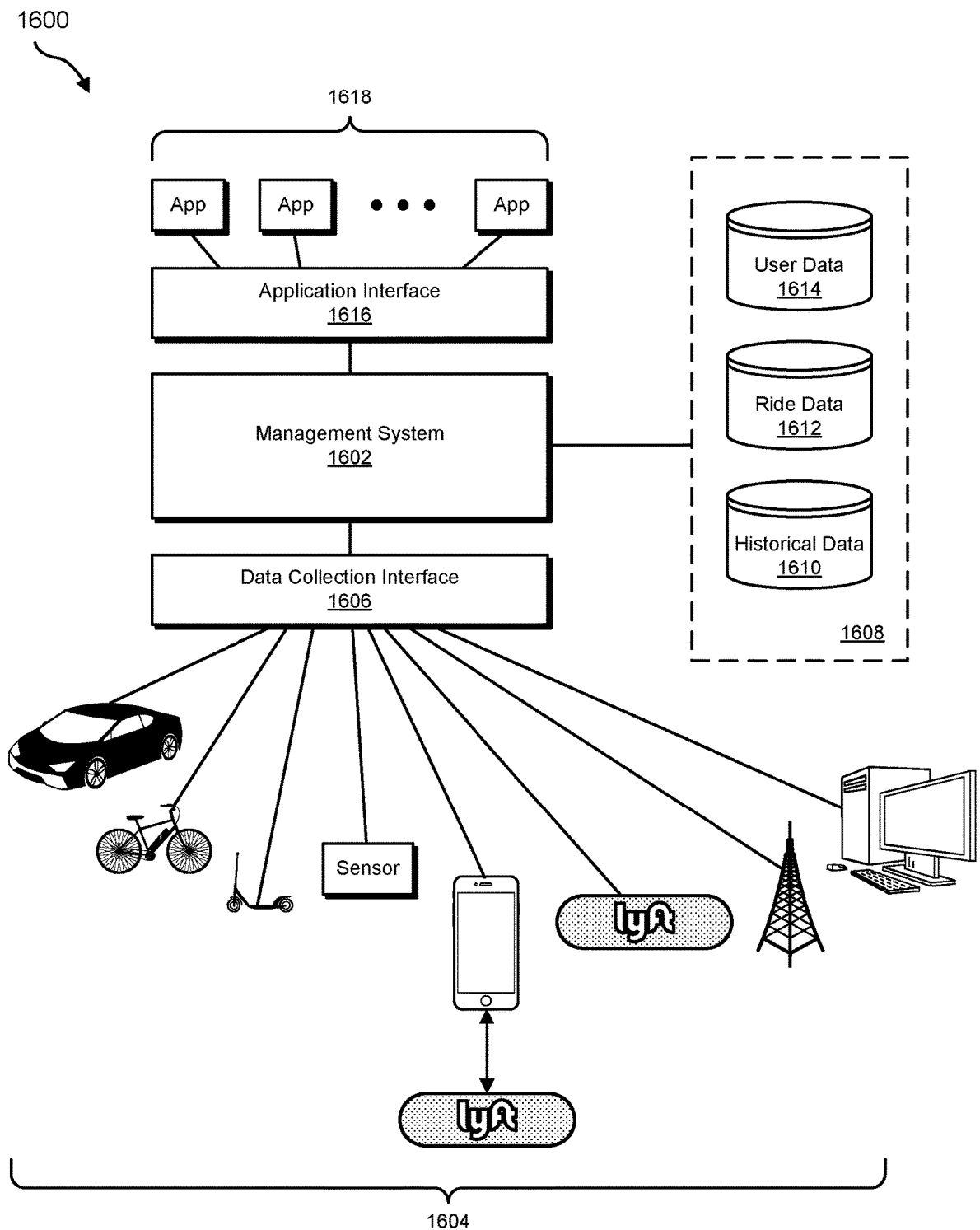
FIG. 16 is an illustration of an example data collection and application management system.

FIG. 16 shows a data collection and application management environment 1600, in accordance with various embodiments. As shown in FIG. 16, management system 1602 may be configured to collect data from various data collection devices 1604 through a data collection interface 1606. As discussed above, management system 1602 may include one or more computers and/or servers or any combination thereof. Data collection devices 1604 may include, but are not limited to, user devices (including provider and requestor computing devices, such as those discussed above), provider communication devices, laptop or desktop computers, vehicle data (e.g., from sensors integrated into or otherwise connected to vehicles), ground-based or satellite-based sources (e.g., location data, traffic data, weather data, etc.), or other sensor data (e.g., roadway embedded sensors, traffic sensors, etc.). Data collection interface 1606 can include, e.g., an extensible device framework configured to support interfaces for each data collection device. In various embodiments, data collection interface 1606 may be extended to support new data collection devices as they are released and/or to update existing interfaces to support changes to existing data collection devices. In various embodiments, data collection devices may communicate with data collection interface 1606 over one or more networks. The networks may include any network or communication protocol as would be recognized by one of ordinary skill in the art, including those networks discussed above.

As shown in FIG. 16, data received from data collection devices 1604 can be stored in data store 1608. Data store 1608 may include one or more data stores, such as databases, object storage systems and services, cloud-based storage services, and other data stores. For example, various data stores may be implemented on a non-transitory storage medium accessible to management system 1602, such as historical data store 1610, ride data store 1612, and user data store 1614. Data stores 1608 can be local to management system 1602, or remote and accessible over a network, such as those networks discussed above or a storage-area network or other networked storage system. In various embodiments, historical data 1610 may include historical traffic data, weather data, request data, road condition data, or any other data for a given region or regions received from various data collection devices. Ride data 1612 may include route data, request data, timing data, and other ride related data, in aggregate and/or by requestor or provider. User data 1614 may include user account data, preferences, location history, and other user-specific data. Although certain data stores are shown by way of example, any data collected and/or stored according to the various embodiments described herein may be stored in data stores 1608.

As shown in FIG. 16, an application interface 1616 can be provided by management system 1602 to enable various apps 1618 to access data and/or services available through management system 1602. Apps 1618 may run on various user devices (including provider and requestor computing devices, such as those discussed above) and/or may include cloud-based or other distributed apps configured to run across various devices (e.g., computers, servers, or combinations thereof). Apps 1618 may include, e.g., aggregation and/or reporting apps which may utilize data 1608 to provide various services (e.g., third-party ride request and management apps). In various embodiments, application interface 1616 can include an API and/or SPI enabling third party development of apps 1618. In some embodiments, application interface 1616 may include a web interface, enabling web-based access to data 1608 and/or services provided by management system 1602. In various embodiments, apps 1618 may run on devices configured to communicate with application interface 1616 over one or more networks. The networks may include any network or communication protocol as would be recognized by one of ordinary skill in the art, including those networks discussed above, in accordance with an embodiment of the present disclosure.

While various embodiments of the present disclosure are described in terms of a networked transportation system in which the ride providers are human drivers operating their own vehicles, in other embodiments, the techniques described herein may also be used in environments in which ride requests are fulfilled using autonomous or semi-autonomous vehicles. For example, a transportation management system of a networked transportation service may facilitate the fulfillment of ride requests using both human drivers and autonomous vehicles. Additionally or alternatively, without limitation to transportation services, a matching system for any service may facilitate the fulfillment of requests using both human drivers and autonomous vehicles.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
    determining, by a personal mobility vehicle equipped with a braking system and used by a rider, a road condition associated with a geographic location of the personal mobility vehicle;
    determining, based on previously collected riding data of the rider, a riding behavior of the rider associated with the road condition;
    determining, in response to the determination of the riding behavior of the rider associated with the road condition, one or more optimized operations for the personal mobility vehicle based on previously collected riding data of the rider or one or more other riders;
    determining a configuration of the braking system based at least in part on the one or more optimized operations for the personal mobility vehicle; and
    engaging the braking system of the personal mobility vehicle using the configuration while traversing the geographic location associated with the road condition.

2. The method of claim 1, wherein the road condition associated with the geographic location of the personal mobility vehicle corresponds to a first braking-related attribute that impacts braking at the geographic location of the personal mobility vehicle.

3. The method of claim 2, wherein determining the road condition associated with the geographic location of the personal mobility vehicle comprises determining the first braking-related attribute that impacts braking at the geographic location of the personal mobility vehicle.

4. The method of claim 2, wherein the first braking-related attribute that impacts braking at the geographic location of the personal mobility vehicle comprises ground slope, ground surface type, surface condition, expected weather, or nearby obstacle density associated with the geographic location.

5. The method of claim 4, wherein the first braking-related attribute that impacts braking at the geographic location of the personal mobility vehicle further comprises a dynamic attribute that is intermittently present at the geographic location.

6. The method of claim 3, further comprising storing one or more records to a reaction database associated with one or more reactions of the rider to the first braking-related attribute, wherein each of the one or more records comprise the first braking-related attribute and an input of the rider to the braking system.

7. The method of claim 6, wherein determining the riding behavior of the rider associated with the road condition comprises retrieving, from the reaction database, one or more records associated with previous reactions of the rider to second braking-related attributes, wherein differences of the second braking-related attributes from the first braking-related attribute are within a pre-determined threshold.

8. The method of claim 2, further comprising:
    identifying a front wheel braking system and a rear wheel braking system; and
    determining a distribution differential between the front wheel braking system and the rear wheel braking system based at least in part on the first braking-related attribute.

9. The method of claim 1, wherein the rider has a first characteristics, wherein the one or more other riders have second characteristics, and wherein differences between the first characteristics and the second characteristics are within a pre-determined threshold.

10. The method of claim 9, wherein characteristics comprise demographics or riding behavior.

11. The method of claim 1, determining the one or more optimized operations for the personal mobility vehicle comprises determining one or more operations that compensate the riding behavior of the rider associated with the road condition.

12. The method of claim 11, wherein the one or more optimized operations for the personal mobility vehicle comprises reducing an engagement of a front brake on a downhill slope in response to a determination that the rider has historically over-engaged the front brake on downhill slopes.

13. A system comprising:
    one or more processors; and
    a non-transitory memory comprising instructions executable by the one or more processors to cause the system to perform operations comprising:
        determining, by a personal mobility vehicle equipped with a braking system and used by a rider, a road condition associated with a geographic location of the personal mobility vehicle;
        determining, based on previously collected riding data of the rider, a riding behavior of the rider associated with the road condition;
        determining, in response to the determination of the riding behavior of the rider associated with the road condition, one or more optimized operations for the personal mobility vehicle based on previously collected riding data of the rider or one or more other riders;
        determining a configuration of the braking system based at least in part on the one or more optimized operations for the personal mobility vehicle; and
        engaging the braking system of the personal mobility vehicle using the configuration while traversing the geographic location associated with the road condition.

14. The system of claim 13, wherein the road condition associated with the geographic location of the personal mobility vehicle corresponds to a first braking-related attribute that impacts braking at the geographic location of the personal mobility vehicle.

15. The system of claim 14, wherein determining the road condition associated with the geographic location of the personal mobility vehicle comprises determining the first braking-related attribute that impacts braking at the geographic location of the personal mobility vehicle.

16. The system of claim 14, wherein the first braking-related attribute that impacts braking at the geographic location of the personal mobility vehicle comprises ground slope, ground surface type, surface condition, expected weather, or nearby obstacle density associated with the geographic location.

17. The system of claim 16, wherein the first braking-related attribute that impacts braking at the geographic location of the personal mobility vehicle further comprises a dynamic attribute that is intermittently present at the geographic location.

18. The system of claim 15, further comprising storing one or more records to a reaction database associated with one or more reactions of the rider to the first braking-related attribute, wherein each of the one or more records comprise the first braking-related attribute and an input of the rider to the braking system.

19. The system of claim 18, wherein determining the riding behavior of the rider associated with the road condition comprises retrieving, from the reaction database, one or more records associated with previous reactions of the rider to second braking-related attributes, wherein differences of the second braking-related attributes from the first braking-related attribute are within a pre-determined threshold.

20. One or more computer-readable non-transitory storage media embodying software that is operable when executed by a user computing device to perform operations comprising:

determining, by a personal mobility vehicle equipped with a braking system and used by a rider, a road condition associated with a geographic location of the personal mobility vehicle;

determining, based on previously collected riding data of the rider, a riding behavior of the rider associated with the road condition;

determining, in response to the determination of the riding behavior of the rider associated with the road condition, one or more optimized operations for the personal mobility vehicle based on previously collected riding data of the rider or one or more other riders;

determining a configuration of the braking system based at least in part on the one or more optimized operations for the personal mobility vehicle; and engaging the braking system of the personal mobility vehicle using the configuration while traversing the geographic location associated with the road condition.

\* \* \* \* \*